United States Patent
Long et al.

(10) Patent No.: US 10,780,388 B2
(45) Date of Patent: Sep. 22, 2020

(54) METAL-ORGANIC FRAMEWORKS APPENDED WITH CYCLIC DIAMINES FOR CARBON DIOXIDE CAPTURE

(71) Applicants: The Regents of the University of California, Oakland, CA (US); ExxonMobil Research and Engineering Company, Annandale, NJ (US)

(72) Inventors: Jeffrey R. Long, Oakland, CA (US); Simon Christopher Weston, Annandale, NJ (US); Phillip J. Milner, Albany, CA (US); Rebecca L. Siegelman, Berkeley, CA (US)

(73) Assignees: The Regents of the University of California, Oakland, CA (US); ExxonMobil Research and Engineering Company, Annandale, NJ (US)

( * ) Notice: Subject to any disclaimer, the term of this patent is extended or adjusted under 35 U.S.C. 154(b) by 148 days.

(21) Appl. No.: 16/054,800

(22) Filed: Aug. 3, 2018

(65) Prior Publication Data

US 2019/0039015 A1    Feb. 7, 2019

Related U.S. Application Data

(60) Provisional application No. 62/541,616, filed on Aug. 4, 2017.

(51) Int. Cl.
*B01J 20/22* (2006.01)
*B01D 53/14* (2006.01)
(Continued)

(52) U.S. Cl.
CPC ......... *B01D 53/1475* (2013.01); *B01D 53/02* (2013.01); *B01D 53/04* (2013.01);
(Continued)

(58) Field of Classification Search
None
See application file for complete search history.

(56) References Cited

U.S. PATENT DOCUMENTS

2016/0208047 A1* 7/2016 Huang ............... B01J 20/0225

FOREIGN PATENT DOCUMENTS

| WO | WO 2013/059527 A1 | 4/2013 |
| WO | WO 2017/059130 A2 | 4/2017 |

OTHER PUBLICATIONS

U.S. Appl. No. 16/045,616, filed Jul. 25, 2018.
(Continued)

*Primary Examiner* — Anita Nassiri-Motlagh
(74) *Attorney, Agent, or Firm* — Morgan, Lewis & Bockius LLP

(57) ABSTRACT

Achieving the selective and reversible adsorption of $CO_2$ from humid, low partial pressures streams such as the flue gas resulting from the combustion of natural gas in combined cycle power plants (4% $CO_2$) is challenging due to the need for high thermal, oxidative, and hydrolytic stability as well as moderate regeneration conditions to reduce the energy of adsorption/desorption cycling. Appending cyclic primary, secondary diamines, exemplified by 2-(aminomethyl)piperidine (2-ampd), to the metal-organic frameworks $Mg_2$(dobpdc) (dobpdc$^{4-}$=4,4-dioxidobiphenyl-3,3-dicarboxylate), $Mg_2$(dotpdc) (dotpdc$^{4-}$=4,4"-dioxido-[1,1':4',1"-terphenyl]-3,3"-dicarboxylate) or $Mg_2$(pc-dobpdc) (pc-dobpdc$^{4-}$=dioxidobiphenyl-4,4'-dicarboxylate) produces adsorbents of the classes EMM-44, EMM-45, and EMM-46, respectively, that display step-shaped adsorption of $CO_2$ at the partial pressures required for 90% capture from natural gas flue gas at temperatures up to or exceeding 60° C. Using a cyclic diamine in place of a diamine functionalized with (Continued)

bulky alkyl groups enables fast adsorption/desorption kinetics with sharp $CO_2$ adsorption and desorption steps.

26 Claims, 22 Drawing Sheets

(51) Int. Cl.
*B01D 53/04* (2006.01)
*B01D 53/02* (2006.01)
*B01D 53/047* (2006.01)
*C07F 3/02* (2006.01)

(52) U.S. Cl.
CPC ....... *B01D 53/047* (2013.01); *B01D 53/0462* (2013.01); *B01J 20/226* (2013.01); *C07F 3/02* (2013.01); *B01D 2252/20436* (2013.01); *B01D 2253/204* (2013.01); *B01D 2253/306* (2013.01); *B01D 2257/504* (2013.01); *B01D 2258/0283* (2013.01)

(56) References Cited

OTHER PUBLICATIONS

International Search Report and Written Opinion for International Application No. PCT/US2018/045259 dated Nov. 28, 2018, 14 pages.

Ling, Y. et al., "Enhancing CO2 adsorption of a Zn-phosphonocarboxylate framework by pore space partitions", Chemical Communications, vol. 49, No. 1, Nov. 5, 2012, pp. 78-80.

Ling, Y. et al., "Enhancing CO2 adsorption of a Zn-phosphonocarboxylate framework by pore space partitions", Electronic supplementary information, Nov. 27, 2012.

Siegelman, R. et al., "Controlling Cooperative CO2 Adsorption in Diamine-Appended Mg 2 (dobpdc) Metal-Organic Frameworks," Journal of the American Chemical Society, vol. 139, No. 30, Jul. 19, 2017, pp. 10526-10538.

ExxonMobil, "Outlook for Energy: A View to 2040," Feb. 2, 2018, on the Internet at https://corporate.exxonmobil.com/energy-and-environment/energy-resources/outlook-for-energy/2018-outlook-for-energy-a-view-to-2040#aViewTo2040, accessed Mar. 7, 2019.

McDonald et al., 2015, Nature 519, p. 303.

Milner, P. et al., "Overcoming double-step CO2 adsorption and minimizing water co-adsorption in bulky diamine-appended variants of Mg 2 (dobpdc)", Chemical Science, vol. 9, No. 1, Jan. 1, 2018, pp. 160-174.

Quadrelli et al., 2007, "The energy-climate challenge: Recent trends in CO2 emissions from fuel combustion," Energy Policy 35, pp. 5938-5952.

Pachauri and Meyer, Climate Change 2014: Synthesis Report. Contribution of Working Groups I, II and III to the Fifth Assessment Report of the Intergovernmental Panel on Climate Change, International Government Panel on Climate Change, Geneva, Switzerland, 2014.

Planas et al., 2013, "The Mechanism of Carbon Dioxide Adsorption in an Alkylamine-Functionalized Metal-Organic Framework," J. Am. Chem. Soc. 135, pp. 7402-7405.

Vaccarelli et al., 2014, Energy Procedia 45, p. 1165.

* cited by examiner

METAL-ORGANIC FRAMEWORKS APPENDED WITH CYCLIC DIAMINES FOR CARBON DIOXIDE CAPTURE

CROSS REFERENCE TO RELATED APPLICATION

This application claims priority to U.S. Provisional Patent Application No. 62/541,616, entitled "Metal-Organic Frameworks Appended with Cyclic Diamines for $CO_2$ Capture," filed Aug. 4, 2017, which is hereby incorporated by reference.

FIELD OF THE PRESENT DISCLOSURE

The present application relates to adsorbents that enable effective capture of $CO_2$ at low partial pressures while being regenerable at moderate temperatures with a low regeneration energy for carbon capture applications.

BACKGROUND

Carbon dioxide ($CO_2$) generated from burning fossil fuels at thermoelectric power plants is likely a major contributor to global climate change. See, Pachauri and Meyer, Climate Change 2014: Synthesis Report. Contribution of Working Groups I, II and III to the Fifth Assessment Report of the Intergovernmental Panel on Climate Change, International Government Panel on Climate Change, Geneva, Switzerland, 2014. Addressing the increasing atmospheric levels of $CO_2$ requires new strategies for reducing $CO_2$ emissions from point sources such as natural gas-fired power plants, which are currently responsible for approximately 20% of global $CO_2$ emissions. See, Quadrelli and Peterson, 2007, Energy Policy 35, p. 5938. This share will increase in the near future as economic factors favor a transition from coal to natural gas as a fossil fuel source. See, ExxonMobil, "Outlook for Energy: Journey to 2040," on the Internet at corporate.exxonmobil.com/en/energy/energy-outlook/highlights/, accessed Jul. 20, 2017. The combustion of natural gas produces a 1 bar total pressure stream containing approximately 4-10% $CO_2$ at 40-60° C., with the remainder of the stream consisting of $H_2O$ (saturated), $O_2$ (4-12%), and $N_2$ (remainder). See, Vaccarelli et al., 2014, Energy Procedia 45, p. 1165. Therefore, in the most challenging case removing ≥90% of the $CO_2$ from natural gas flue gas requires selective adsorption from a humid gas stream containing less than ≤0.4% (4 mbar) $CO_2$, which is a highly challenging separation. In addition, the adsorbent must possess long-term stability to both humidity and adsorption/desorption cycling for application in a temperature swing adsorption (TSA) process.

Adsorbents that show step-shaped adsorption of $CO_2$, such as alkylethylenediamine-appended variants of the metal-organic framework $Mg_2$(dobpdc) (dobpdc$^{4-}$=4,4'-dioxidobiphenyl-3,3'-dicarboxylate) (McDonald et al., 2015, Nature 519, p. 303; Siegelman, 2017, J. Am. Chem. Soc., 139, p. 10526) offer promise for such carbon capture applications (FIG. 1). These materials adsorb $CO_2$ by the cooperative formation of ammonium carbamate chains, which leads to step-shaped adsorption isotherms that enable high working capacities to be achieved with low regeneration energies and minimal temperature swings. See, McDonald et al., 2015, Nature 519, p. 303. However, one concern with materials that are post-synthetically functionalized is diamine loss from the $Mg^{2+}$ centers upon adsorption/desorption cycling, which will lead to gradual adsorbent degradation. Appending higher molecular weight diamines is a potential means to overcome this issue, but large alkyl groups on the diamines could potentially interfere with both the adsorption/desorption kinetics as well as the $CO_2$ adsorption mechanism.

Accordingly, what is needed in the art are adsorbents that enable effective capture of $CO_2$ at low partial pressures of $CO_2$ and that can be stably regenerated numerous times.

SUMMARY

Herein, we demonstrate that high molecular weight cyclic diamines such as 2-(aminomethyl)piperidine (2-ampd) and 3-aminopyrrolidine (3-apyrr) can be appended to $Mg_2$(dobpdc) (dobpdc$^{4-}$=4,4'-dioxidobiphenyl-3,3'-dicarboxylate), $Mg_2$(dotpdc) (dotpdc$^{4-}$=4,4"-dioxido-[1,1':4',1"-terphenyl]-3,3"-dicarboxylate), and $Mg_2$(pc-dobpdc) (pc-dobpdc$^{4-}$=dioxidobiphenyl-4,4'-dicarboxylate) to produce the stable classes of adsorbents EMM-44, EMM-45, and EMM-46, respectively, which display $CO_2$ adsorption steps at low partial pressures of $CO_2$, making them suitable for $CO_2$ removal from dilute gas streams such as the flue gas emissions of natural gas-fired power plants.

DETAILED DESCRIPTION OF THE INVENTION

I. Introduction

Figure 1:
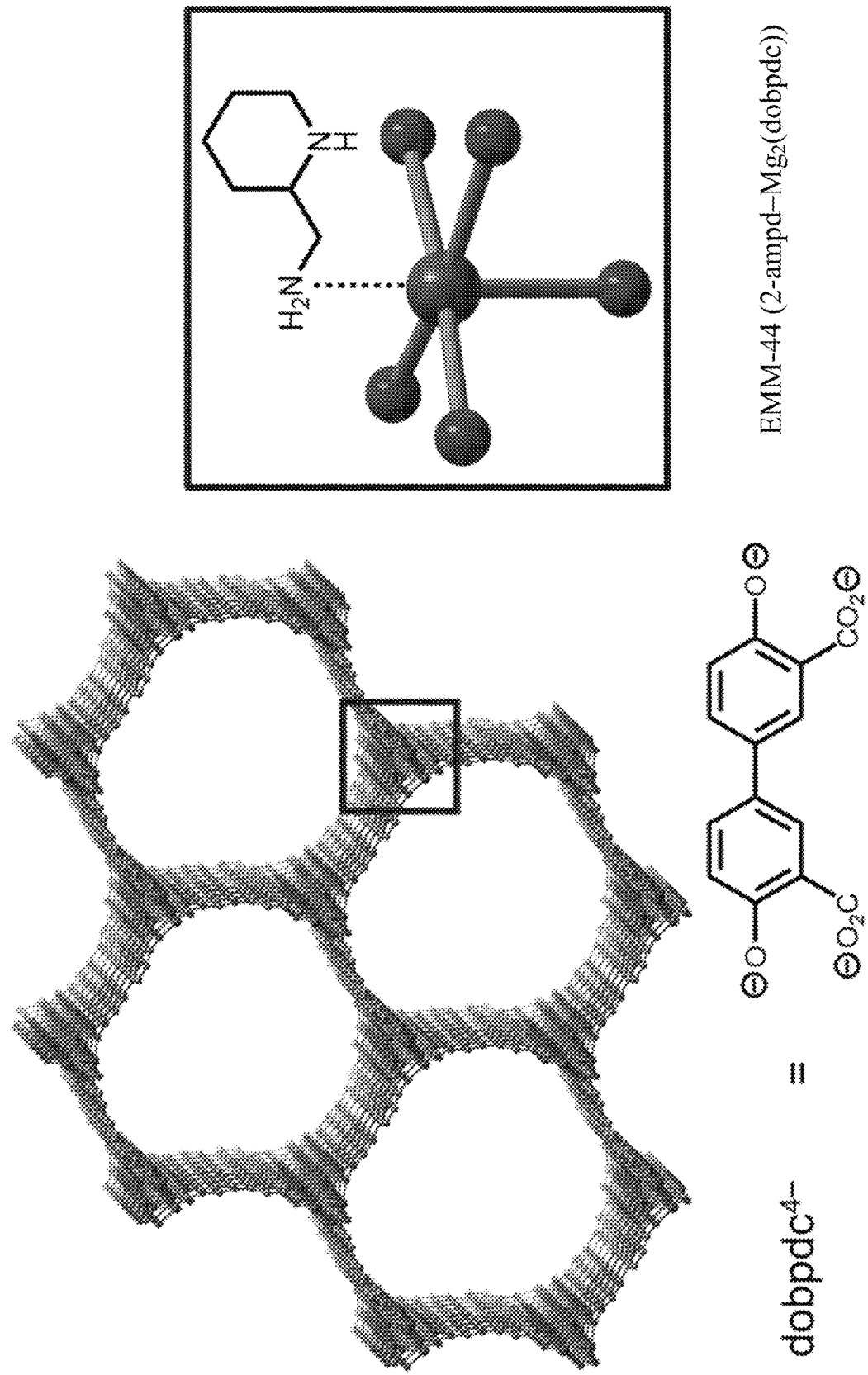
FIG. 1 illustrates the structure of a diamine-appended metal-organic framework EMM-44 (2-ampd-$Mg_2$(dobpdc)), in accordance with the present disclosure.

Appending the diamine 2-(aminomethyl)piperidine (2-ampd) to the open $Mg^{2+}$ sites of the metal-organic frameworks $Mg_2$(dobpdc) ($dobpdc^{4-}$=4,4'-dioxidobiphenyl-3,3'-dicarboxylate), $Mg_2$(dotpdc) ($dotpdc^{4-}$=4,4"-dioxido-[1,1':4',1"-terphenyl]-3,3"-dicarboxylate) or $Mg_2$(pc-dobpdc) ($pc$-$dobpdc^{4-}$=dioxidobiphenyl-4,4'-dicarboxylate) produces the promising adsorbents EMM-44, EMM-45, and EMM-46, respectively, for the capture of $CO_2$ from the flue emissions of natural gas-fired power plants (FIG. 1). There are numerous features of this adsorbent that make it promising for carbon capture from natural gas-fired power plants.

Before the invention is described in greater detail, it is to be understood that the invention is not limited to particular embodiments described herein as such embodiments may vary. It is also to be understood that the terminology used herein is for the purpose of describing particular embodiments only, and the terminology is not intended to be limiting. The scope of the invention will be limited only by the appended claims. Unless defined otherwise, all technical and scientific terms used herein have the same meaning as commonly understood by one of ordinary skill in the art to which this invention belongs. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number. All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided might be different from the actual publication dates, which may need to be independently confirmed.

It is noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method may be carried out in the order of events recited or in any other order that is logically possible. Although any methods and materials similar or equivalent to those described herein may also be used in the practice or testing of the invention, representative illustrative methods and materials are now described.

In describing the present invention, the following terms will be employed, and are defined as indicated below.

II. Definitions

Where substituent groups are specified by their conventional chemical formulae, written from left to right, the structures optionally also encompass the chemically identical substituents, which would result from writing the structure from right to left, e.g., —$CH_2O$— is intended to also optionally recite —$OCH_2$—.

The term "alkyl," by itself or as part of another substituent, means, unless otherwise stated, a straight or branched chain, or cyclic hydrocarbon radical, or combination thereof, which may be fully saturated, mono- or polyunsaturated and can include di-, tri- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to optionally include those derivatives of alkyl defined in more detail below, such as "heteroalkyl." Alkyl groups that are limited to hydrocarbon groups are termed "homoalkyl." Exemplary alkyl groups include the monounsaturated $C_{9-10}$, oleoyl chain or the diunsaturated $C_{9-10, 12-13}$ linoeyl chain.

The term "alkylene" by itself or as part of another substituent means a divalent radical derived from an alkane, as exemplified, but not limited, by —$CH_2CH_2CH_2CH_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The terms "aryloxy" and "heteroaryloxy" are used in their conventional sense, and refer to those aryl or heteroaryl groups attached to the remainder of the molecule via an oxygen atom.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$, —S(O)—$CH_3$, —$CH_2$—$CH_2$—S(O)$_2$—$CH_3$, —CH=CH—O—$CH_3$, —Si($CH_3$)$_3$, —$CH_2$—CH=N—$OCH_3$, and —CH=CH—N($CH_3$)—$CH_3$. Up to two heteroatoms may be consecutive, such as, for example, —$CH_2$—NH—$OCH_3$ and —$CH_2$—O—Si($CH_3$)$_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —$CO_2R'$— represents both —C(O)OR' and —OC(O)R'.

The terms "cycloalkyl" and "heterocycloalkyl," by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Further exemplary cycloalkyl groups include steroids, e.g., cholesterol and its derivatives. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl substituent groups (or rings) that contain from one to four heteroatoms selected from N, O, S, Si and B, wherein the nitrogen and sulfur atoms are optionally oxidized, and the nitrogen atom(s) are optionally quaternized. An exemplary heteroaryl group is a six-membered azine, e.g., pyridinyl, diazinyl and triazinyl. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes aryl, heteroaryl and heteroarene rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl, and "heteroaryl") are meant to optionally include both substituted and unsubstituted forms of the indicated species. Exemplary substituents for these species are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: H, substituted or unsubstituted aryl, substituted or unsubstituted heteroaryl, substituted or unsubstituted heterocycloalkyl, —OR', =O, =NR', =N—OR', —NR'R", —SR', halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —CN and —NO$_2$ in a number ranging from zero to (2m'+1), where m' is the total number of carbon atoms in such radical. R', R", R'" and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R'" and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like). These terms encompass groups considered exemplary "alkyl group substituents", which are components of exemplary "substituted alkyl" and "substituted heteroalkyl" moieties.

Similar to the substituents described for the alkyl radical, substituents for the aryl heteroaryl and heteroarene groups are generically referred to as "aryl group substituents." The substituents are selected from, for example: groups attached to the heteroaryl or heteroarene nucleus through carbon or a heteroatom (e.g., P, N, O, S, Si, or B) including, without limitation, substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro(C$_1$-C$_4$)alkyl, in a number ranging from zero to the total number of open valences on the aromatic ring system. Each of the above-named groups is attached to the heteroarene or heteroaryl nucleus directly or through a heteroatom (e.g., P, N, O, S, Si, or B); and where R', R", R'" and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R'" and R"" groups when more than one of these groups is present.

Two of the substituents on adjacent atoms of the aryl, heteroarene or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl, heteroarene or heteroaryl ring may optionally be replaced with a substituent of the formula —(CRR')$_s$—X—(CR"R'")$_d$—, where s and d are independently integers of from 0 to 3, and X is —O—, —NR'—, —S—, —S(O)—, —S(O)$_2$—, or —S(O)$_2$NR'—. The substituents R, R', R" and R'" are preferably independently selected from hydrogen or substituted or unsubstituted (C$_1$-C$_6$) alkyl. These terms encompass groups considered exemplary "aryl group substituents", which are components of exemplary "substituted aryl" "substituted heteroarene" and "substituted heteroaryl" moieties.

As used herein, the term "acyl" describes a substituent containing a carbonyl residue, C(O)R. Exemplary species for R include H, halogen, substituted or unsubstituted alkyl, substituted or unsubstituted aryl, substituted or unsubstituted heteroaryl, and substituted or unsubstituted heterocycloalkyl.

As used herein, the term "fused ring system" means at least two rings, wherein each ring has at least 2 atoms in common with another ring. "Fused ring systems may include aromatic as well as non-aromatic rings. Examples of "fused ring systems" are naphthalenes, indoles, quinolines, chromenes and the like.

As used herein, the term "heteroatom" includes oxygen (O), nitrogen (N), sulfur (S) and silicon (Si), boron (B) and phosphorous (P).

The symbol "R" is a general abbreviation that represents a substituent group that is selected from H, substituted or unsubstituted alkyl, substituted or unsubstituted heteroalkyl, substituted or unsubstituted aryl, substituted or unsubstituted heteroaryl, and substituted or unsubstituted heterocycloalkyl groups.

The compounds disclosed herein may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I) or carbon-14 ($^{14}$C). All isotopic variations of the compounds of the present invention, whether radioactive or not, are intended to be encompassed within the scope of the present invention.

The term "salt(s)" includes salts of the compounds prepared by the neutralization of acids or bases, depending on the particular ligands or substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of base addition salts include sodium, potassium, calcium, ammonium, organic amino, or magnesium salt, or a similar salt. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids, and the like, as well as the salts derived from relatively nontoxic organic acids like acetic, propionic, isobutyric, butyric, maleic, malic, malonic, benzoic, succinic, suberic, fumaric, lactic, mandelic, phthalic, benzenesulfonic, p-tolylsulfonic, citric, tartaric, methanesulfonic, and the like. Certain specific compounds of the present invention contain both basic and acidic functionalities that allow the compounds to be converted into either base or acid addition salts. Hydrates of the salts are also included.

"—COOH" as this term is used refers to is meant to optionally include —C(O)O$^-$ and —C(O)O$^-$X$^+$, wherein X$^+$ is a cationic counter-ion. Likewise, a substituent having the formula —N(R)(R) is meant to optionally include —N$^+$H(R)(R) and —N$^+$H(R)(R)Y$^-$, wherein Y$^-$ represents an anionic counter-ion. Exemplary polymers of the invention include a protonated carboxylic moiety (COOH). Exemplary polymers of the invention include a deprotonated carboxylic moiety (COO$^-$). Various polymers of the invention include both a protonated carboxylic moiety and a deprotonated carboxylic moiety.

It is understood that, in any compound described herein having one or more chiral centers, if an absolute stereochemistry is not expressly indicated, then each center may independently be of R-configuration or S-configuration or a mixture thereof. Thus, the compounds provided herein may be enantiomerically pure or be stereoisomeric mixtures. In addition it is understood that, in any compound described herein having one or more double bond(s) generating geometrical isomers that can be defined as E or Z, each double bond may independently be E or Z a mixture thereof.

Likewise, it is understood that, in any compound described, all tautomeric forms are also intended to be included.

Below are examples of specific embodiments of the present disclosure. The examples are offered for illustrative purposes only, and are not intended to limit the scope of the present invention in any way.

III. Compositions

One aspect of the present disclosure provides an adsorption material. The adsorption material comprises a metal-organic framework comprising a plurality of metal ions and a plurality of polytopic organic linkers. Each polytopic organic linker in the plurality of polytopic organic linker is connected to at least two metal ions in the plurality of metal ions. The adsorption material further comprises a plurality of ligands. Each respective ligand in the plurality of ligands is amine appended to a metal ion in the plurality of metal ions of the metal-organic framework. Each respective ligand in the plurality of ligands has the formula:

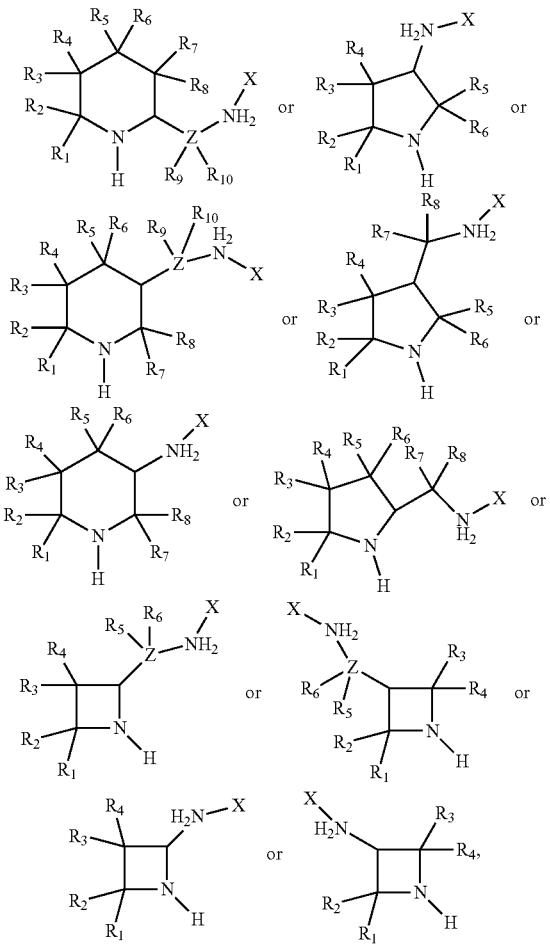

where X is a metal ion of the metal-organic framework, Z is carbon, silicon, germanium, sulfur, or selenium, and $R_1$, $R_2$, $R_3$, $R_4$, $R_5$, $R_6$, $R_7$, $R_8$, $R_9$, and $R_{10}$ are each independently selected from H, halogen, methyl, halogen substituted methyl, and hydroxyl. More generally, in some embodiments, each respective ligand in the plurality is a primary amine appended to saturated X-membered ring, where X is 4, 5, 6, 7, 8 or 9, and where the ring is either a cycloalkyl or a heterocycloalkyl.

In some embodiments, each metal ion (X) in the plurality of metal ions is Mg, Ca, Mn, Cr, Fe, Co, Ni, Cu, or Zn.

In some embodiments, $R_1$, $R_2$, $R_3$, $R_4$, $R_5$, $R_6$, $R_7$, $R_8$, $R_9$, and $R_{10}$ are each hydrogen. In some embodiments, Z is carbon. In some embodiments, each metal ion (X) in the plurality of metal ions is Mg.

In some embodiments, the polytopic organic linker is 4,4'-dioxidobiphenyl-3,3'-dicarboxylate (dobpdc$^{4-}$), 4,4"-dioxido-[1,1':4',1"-terphenyl]-3,3"-dicarboxylate (dotpdc$^{4-}$), or dioxidobiphenyl-4,4'-dicarboxylate (para-carboxylate-dobpdc$^{4-}$ also referred to as pc-dobpdc$^{4-}$).

In some embodiments, the adsorption material exhibits a single $CO_2$ adsorption step upon $CO_2$ adsorption. In some embodiments, the adsorption material exhibits a single $CO_2$ desorption step upon $CO_2$ desorption.

In some embodiments, the adsorption material exhibits a plurality of $CO_2$ adsorption steps upon $CO_2$ adsorption. In some embodiments, the adsorption material exhibits a plurality of $CO_2$ desorption steps upon $CO_2$ desorption.

In some embodiments, the polytopic organic linker has the formula:

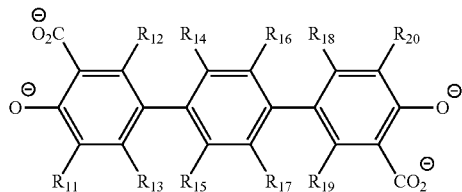

where $R_{11}$, $R_{12}$, $R_{13}$, $R_{14}$, $R_{15}$, $R_{16}$, $R_{17}$, $R_{18}$, $R_{19}$, and $R_{20}$ are each independently selected from H, halogen, hydroxyl, methyl, and halogen substituted methyl.

In some embodiments, the polytopic organic linker has the formula:

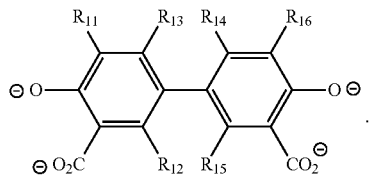

where, $R_{11}$, $R_{12}$, $R_{13}$, $R_{14}$, $R_{15}$, and $R_{16}$ are each independently selected from H, halogen, hydroxyl, methyl, and halogen substituted methyl.

In some embodiments the polytopic organic linker has the formula:

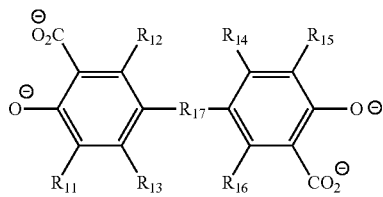

where $R_{11}$, $R_{12}$, $R_{13}$, $R_{14}$, $R_{15}$, and $R_{16}$ are each independently selected from H, halogen, hydroxyl, methyl, or halogen substituted methyl, and $R_{17}$ is selected from substituted or unsubstituted aryl, vinyl, alkynyl, and substituted or unsubstituted heteroaryl.

In some embodiments, the polytopic organic linker has the formula:

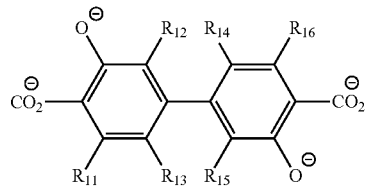

where $R_{11}$, $R_{12}$, $R_{13}$, $R_{14}$, $R_{15}$, and $R_{16}$ are each independently selected from H, halogen, hydroxyl, methyl, or halogen substituted methyl.

In some embodiments, each respective ligand in the plurality of ligands has the formula:

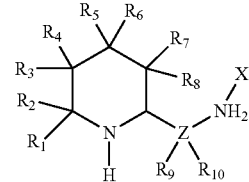

In some such embodiments, $R_1$, $R_2$, $R_3$, $R_4$, $R_5$, $R_6$, $R_7$, $R_8$, $R_9$, and $R_{10}$ are each hydrogen, Z is carbon, and X is Mg. In some embodiments, the polytopic organic linker is 4,4'-dioxidobiphenyl-3,3'-dicarboxylate (dobpdc$^{4-}$), 4,4"-dioxido-[1,1':4',1"-terphenyl]-3,3"-dicarboxylate (dotpdc$^{4-}$), or dioxidobiphenyl-4,4'-dicarboxylate (para-carboxylate-dobpdc$^{4-}$, also referred to as pc-dobpdc$^{4-}$).

In some embodiments, each respective ligand in the plurality of ligands has the formula:

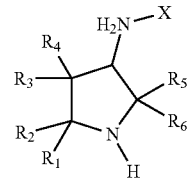

In some embodiments, $R_1$, $R_2$, $R_3$, $R_4$, $R_5$, and $R_6$ are each hydrogen, Z is carbon, and X is Mg. In some embodiments, the polytopic organic linker is 4,4'-dioxidobiphenyl-3,3'-dicarboxylate (dobpdc$^{4-}$), 4,4"-dioxido-[1,1':4',1"-terphenyl]-3,3"-dicarboxylate (dotpdc$^{4-}$), or dioxidobiphenyl-4,4'-dicarboxylate (para-carboxylate-dobpdc$^{4-}$, also referred to as pc-dobpdc$^{4-}$).

IV. Technical Applications

In one aspect of the present disclosure, there is provided a number of technical applications for the disclosed adsorption materials.

One such application is carbon capture from coal flue gas or natural gas flue gas. The increasing atmospheric levels of carbon dioxide ($CO_2$), which are contributing to global climate change, warrant new strategies for reducing $CO_2$ emissions from point sources such as power plants. In particular, coal-fueled power plants are responsible for 30-40% of global $CO_2$ emissions. See, Quadrelli et al., 2007, "The energy-climate challenge: Recent trends in $CO_2$ emissions from fuel combustion," Energy Policy 35, pp. 5938-5952, which is hereby incorporated by reference. Thus, there remains a continuing need for the development of new adsorbents for carbon capture from coal flue gas, a gas stream consisting of $CO_2$ (15-16%), $O_2$ (3-4%), $H_2O$ (5-7%), $N_2$ (70-75%), and trace impurities (e.g. $SO_2$, $NO_x$) at ambient pressure and 40° C. See, Planas et al., 2013, "The Mechanism of Carbon Dioxide Adsorption in an Alkylamine-Functionalized Metal-organic Framework," J. Am. Chem. Soc. 135, pp. 7402-7405, which is hereby incorporated by reference. Similarly, growing use of natural gas as a fuel source necessitates the need for adsorbents capable of $CO_2$ capture from the flue gas of natural gas-fired power plants. Flue gas produced from the combustion of natural gas contains lower $CO_2$ concentrations of approximately 4-10% $CO_2$, with the remainder of the stream consisting of $H_2O$ (saturated), $O_2$ (4-12%), and $N_2$ (balance). In particular, for a temperature swing adsorption process an adsorbent should possess the following properties: (a) a high working capacity with a minimal temperature swing, in order to minimize regeneration energy costs; (b) high selectivity for $CO_2$ over the other constituents of coal flue gas; (c) 90% capture of $CO_2$ under flue gas conditions; (d) effective performance under humid conditions; and (d) long-term stability to adsorption/desorption cycling under humid conditions.

Another such application is carbon capture from crude biogas. Biogas, the $CO_2/CH_4$ mixtures produced by the breakdown of organic matter, is a renewable fuel source with the potential to replace traditional fossil fuel sources. Removal of $CO_2$ from the crude biogas mixtures is one of the most challenging aspects of upgrading this promising fuel source to pipeline quality methane. Therefore, the use of adsorbents to selectively remove $CO_2$ from $CO_2/CH_4$ mixtures with a high working capacity and minimal regeneration energy has the potential to greatly reduce the cost of using biogas in place of natural gas for applications in the energy sector.

The disclosed compositions (adsorption materials) can be used to strip a major portion of the $CO_2$ from the $CO_2$-rich gas stream, and the adsorption material enriched for $CO_2$ can be stripped of $CO_2$ using a temperature swing adsorption method, a pressure swing adsorption method, a vacuum swing adsorption method, a concentration swing adsorption method, or a combination thereof. Example temperature swing adsorption methods and vacuum swing adsorption methods are disclosed in International Publication Number WO2013/059527 A1, which is hereby incorporated by reference.

V. Examples

Application of the Disclosed Compositions and Methods for Carbon Capture from Natural Gas Flue Gas.

Figure 2:
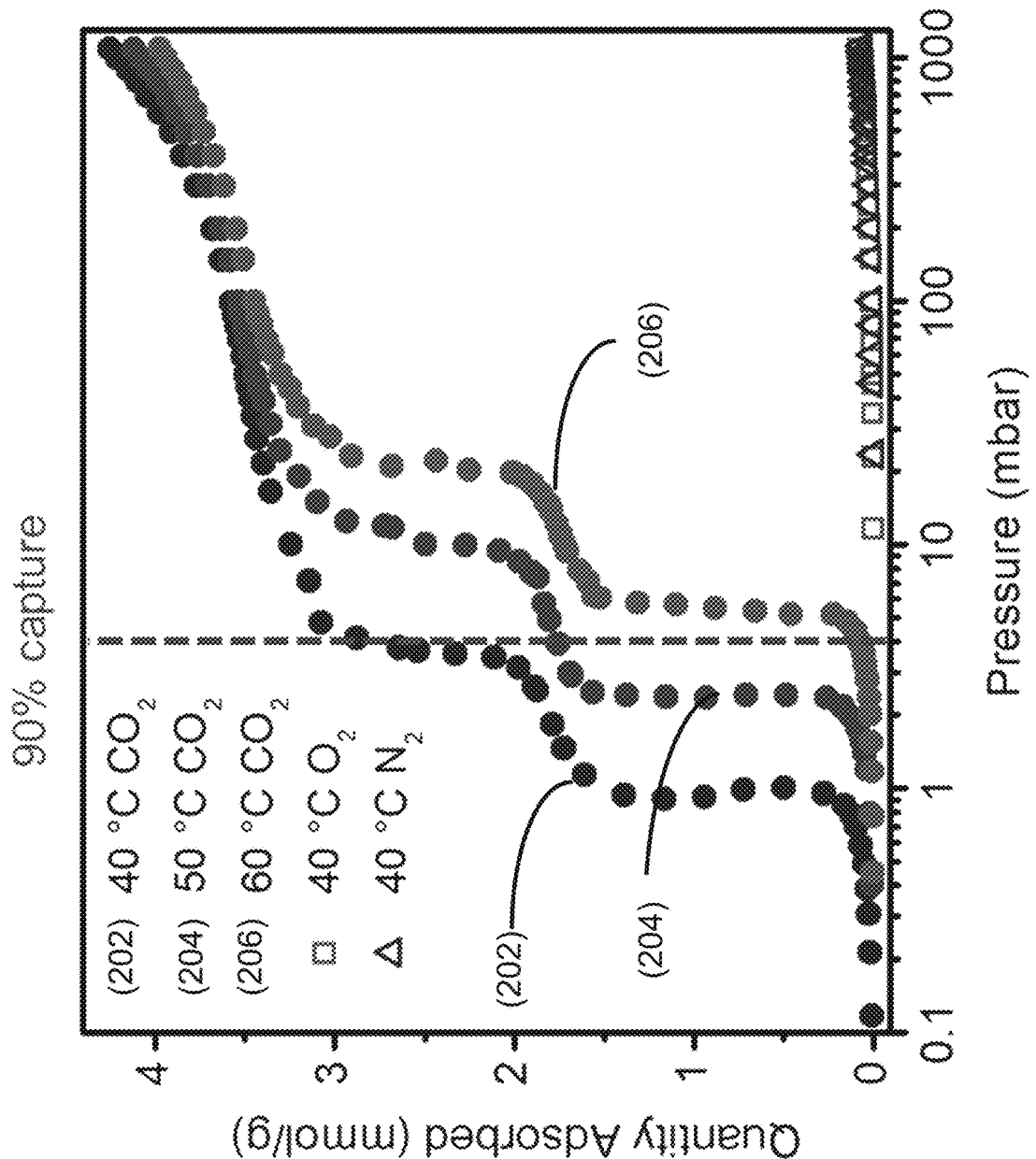
FIG. 2 illustrates isotherms for $CO_2$ at 40° C. (202), 50° C. (204), and 60° C. (206), as well as for $O_2$ (squares) and $N_2$ (triangles) at 40° C., for EMM-44 (2-ampd-$Mg_2$(dobpdc)), in accordance with the present disclosure.
Figure 3:
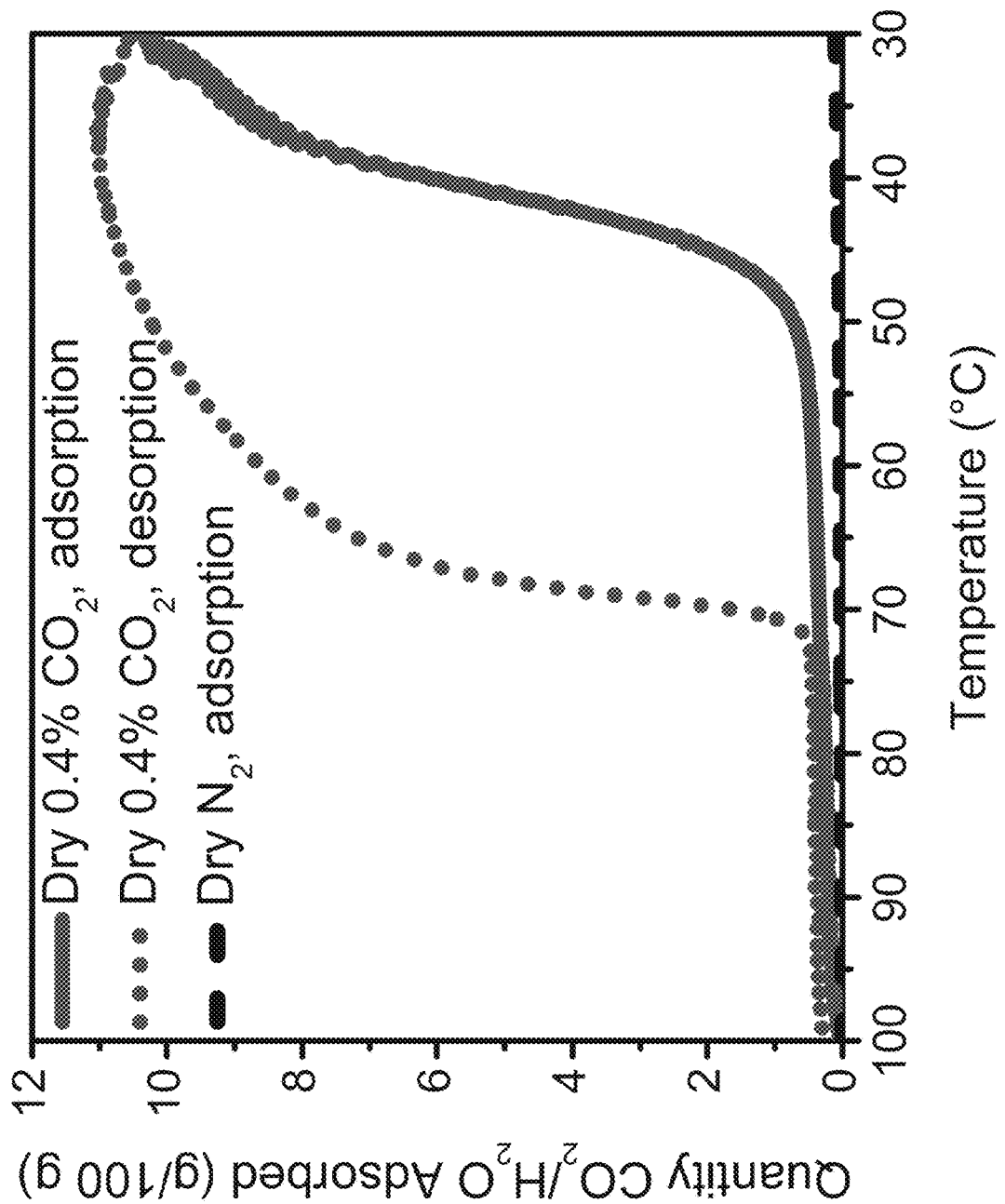
FIG. 3 illustrates adsorption isobars with dry 0.4% $CO_2$ in $N_2$ and dry $N_2$ for EMM-44 (2-ampd-$Mg_2$(dobpdc)), in which a ramp rate of 0.1° C./min was used, in accordance with the present disclosure.
Figure 4:
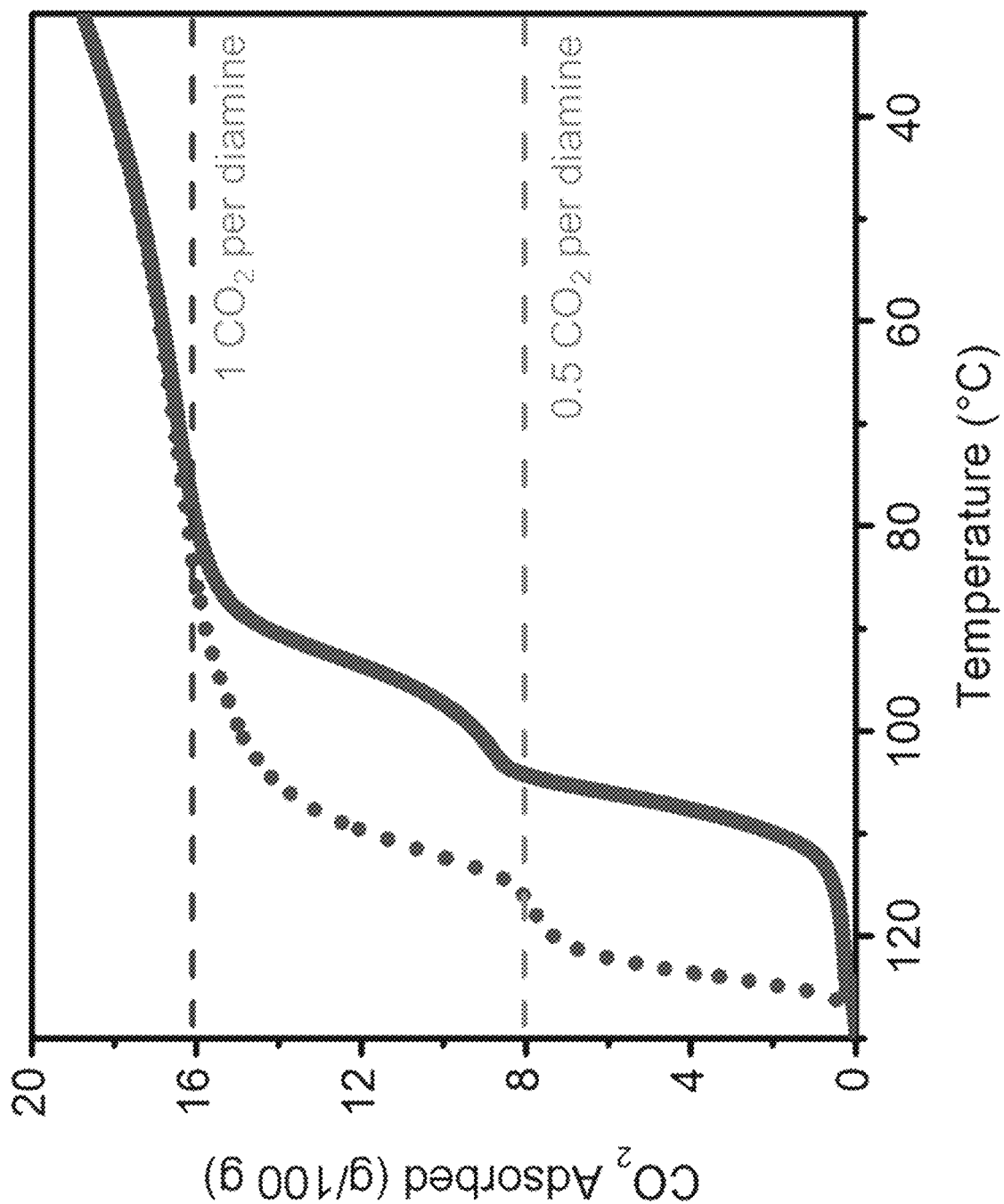
FIG. 4 illustrates pure $CO_2$ adsorption (solid line) and desorption (dotted line) isobars for EMM-44 (2-ampd-$Mg_2$(dobpdc)), in which a ramp rate of 1° C./min was used, and in which the adsorption capacities corresponding to 0.5 $CO_2$ per diamine and 1 $CO_2$ per diamine are indicated, in accordance with the present disclosure.

The $CO_2$ isotherms of EMM-44 (2-ampd-$Mg_2$(dobpdc)) at 40° C., 50° C., and 60° C. confirm that it displays step-shaped adsorption behavior (FIG. 2), likely due to the cooperative formation of ammonium carbamate chains similar to related materials. See, McDonald et al., 2015, Nature 519, p. 303; and Siegelman et al., 2017, J. Am. Chem. Soc., 139, p. 10526. Two distinct $CO_2$ adsorption steps were observed at each temperature, similar to what has been previously observed with variants of $Mg_2$(dobpdc) appended with bulky diamines. See, Siegelman et al., 2017, J. Am. Chem. Soc., 139, p. 10526 and Milner et. al, 2018, Chem. Sci., 9, p. 160. At all three temperatures, both $CO_2$ adsorption steps occur below 40 mbar, indicating that they should be operative under natural gas flue gas conditions. This leads to a high $CO_2$ uptake at 40 mbar (40° C.: 3.47 mmol/g; 50° C.: 3.44 mmol/g; 60° C.: 3.22 mmol/g). In addition, at 40° C. and 50° C. the lower pressure step occurs below 4 mbar, suggesting this material should be able to achieve ≥90% capture from the gas stream at these temperatures. At 60° C., EMM-44 (2-ampd-$Mg_2$(dobpdc)) is predicted to be able to remove approximately 87% of the $CO_2$ from the target stream in the absence of water. Consistently, the 0.4% $CO_2$ in $N_2$ isobar of EMM-44 displays $CO_2$ uptake at temperatures below 60° C. (FIG. 3). The 40° C. $O_2$ and $N_2$ isotherms of this material confirm that it shows negligible uptake of these gases, leading to high noncompetitive $CO_2/N_2$ (~1300) and $CO_2/O_2$ (~700) selectivities at 40° C. at the pressures relevant to the target process (FIG. 2). In addition, the pure $CO_2$ adsorption/desorption isobar reveals that EMM-44 can be fully regenerated under pure dry $CO_2$ at 125° C. (FIG. 4).

Figure 5A:
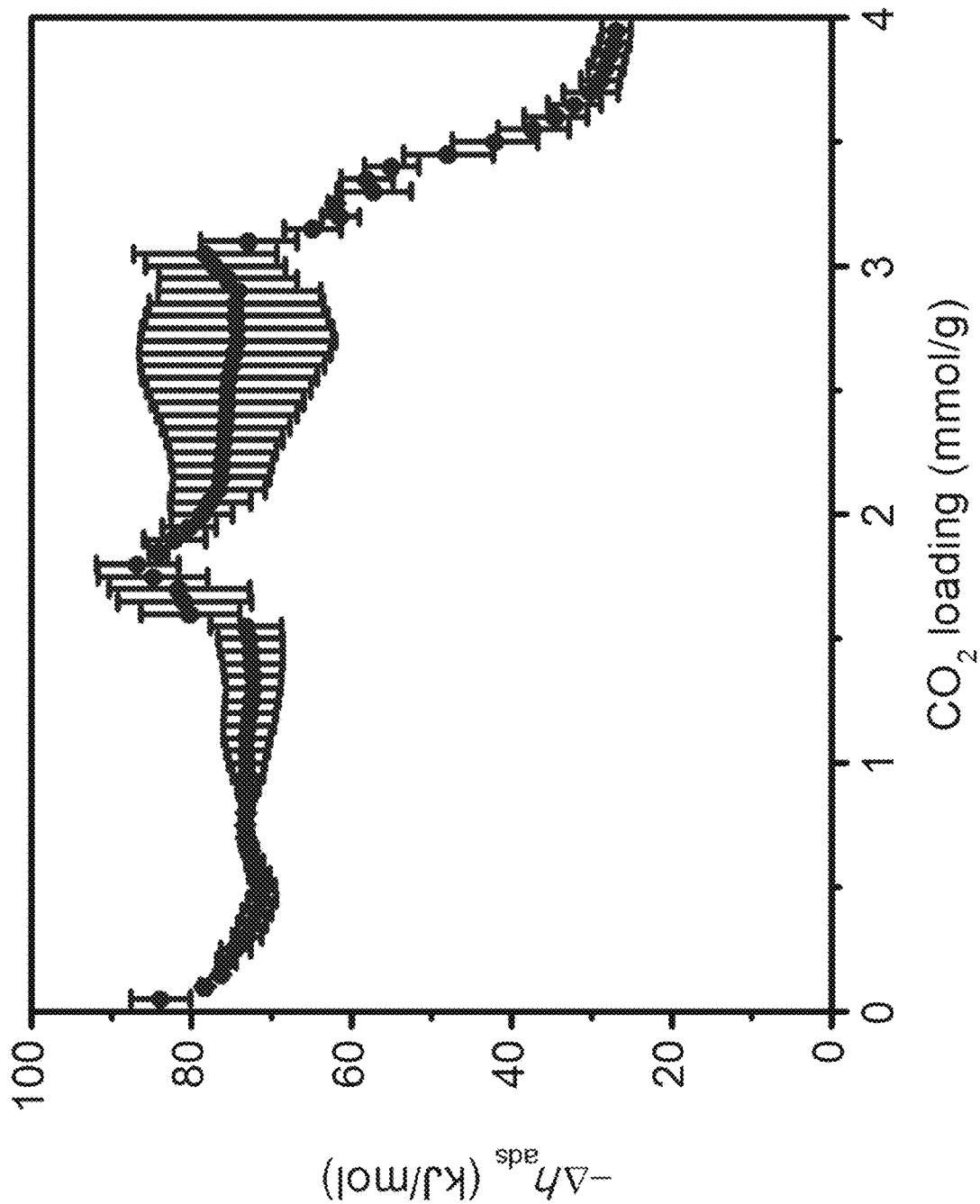
FIG. 5A illustrates negative differential enthalpies of adsorption ($-\Delta h_{ads}$) for EMM-44 (2-ampd-$Mg_2$(dobpdc)) as a function of $CO_2$ loading, as determined from the isotherms in FIG. 2 using the Clausius-Clapeyron relationship, in accordance with the present disclosure.
Figure 5B:
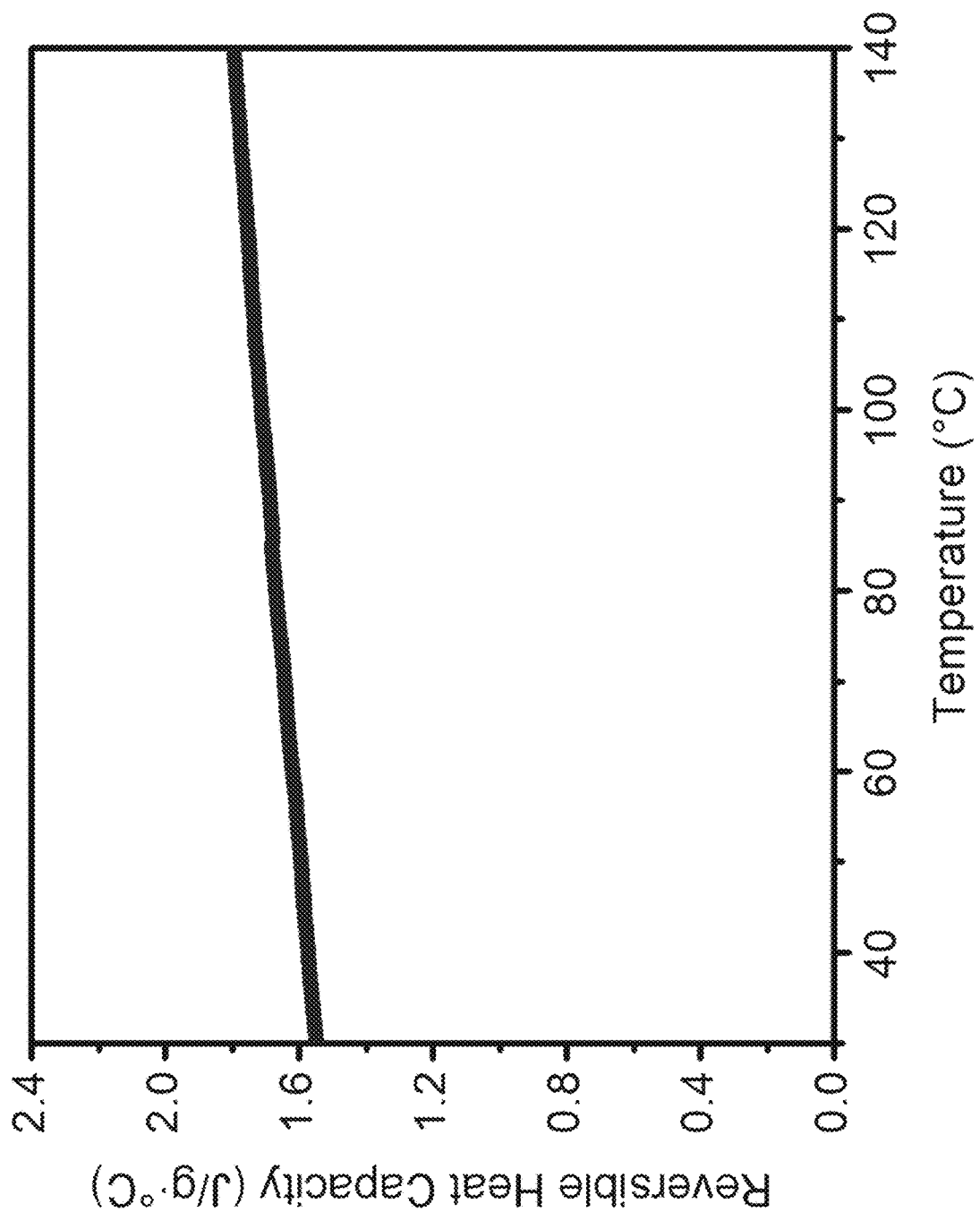
FIG. 5B illustrates reversible heat capacity of EMM-44 (2-ampd-$Mg_2$(dobpdc)) as a function of temperature under an atmosphere of He, as determined by modulated differential scanning calorimetry, in which a ramp rate of 2° C./min and a modulation frequency of 0.75° C./80 s was used, in accordance with the present disclosure.

The differential enthalpy of adsorption ($\Delta h_{ads}$) was determined as a function of $CO_2$ loading (FIG. 5A) through linear interpolation of the isotherms in FIG. 2. The magnitude of the differential enthalpy of adsorption for both $CO_2$ adsorption steps is relatively high (75±5 kJ/mol, 143±9 kJ/kg), which facilitates both the strong adsorption of $CO_2$ and the rapid movement of the $CO_2$ adsorption step pressures as a function of temperature. In addition, referring to FIG. 5B, the average reversible heat capacity of EMM-44 (2-ampd-$Mg_2$(dobpdc)) over the range 40° C. to 140° C. is relatively low (1.67 J/g·° C.). Therefore, it would take only approximately 134 kJ/$kg_{MOF}$ to heat EMM-44 from 60° C. to 140° C. Using this 80° C. temperature swing, the average $CO_2$ adsorption enthalpy, and an anticipated $CO_2$ working capacity of 3.2 mmol/g, a predicted regeneration energy of 2.7 MJ/kg $CO_2$ can be calculated. Reducing the adsorption temperature to 40° C. ($\Delta T=100°$ C.) results in a slight increase in the projected $CO_2$ capacity (3.5 mmol/g) and regeneration energy (2.8 MJ/kg $CO_2$). These values are only estimates, as they assume the framework adsorbs no $CO_2$ at 1 bar at 140° C., they do not account for other co-adsorbed species, and they do not account for the different heat capacity of the $CO_2$-adsorbed phase compared to the activated framework. Nonetheless, these values suggest that $CO_2$ can be desorbed from EMM-44 with a low energy penalty.

Figure 6:
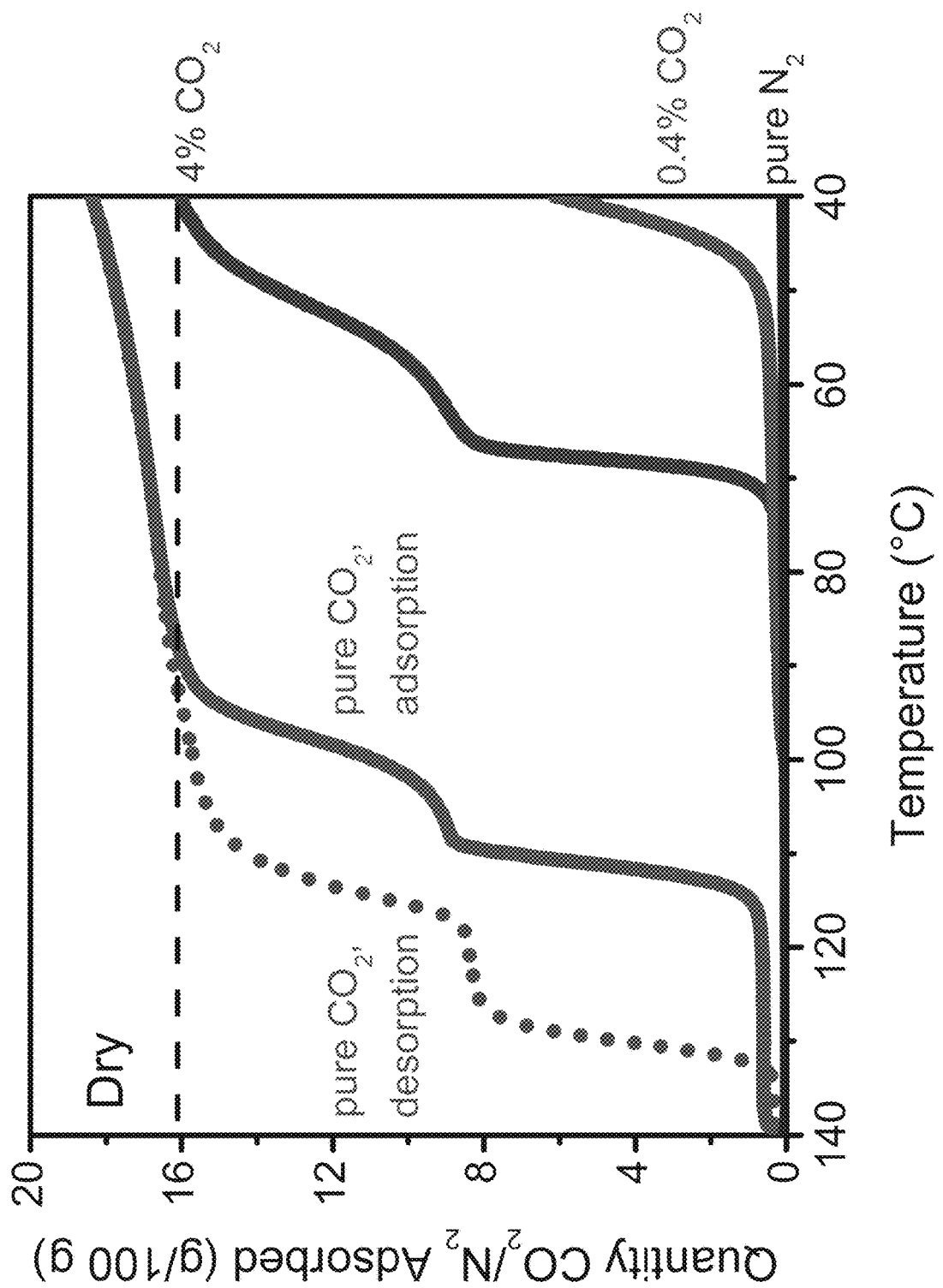
FIG. 6 illustrates dry adsorption and desorption isobars for pure $CO_2$ and dry adsorption isobars for 0.4% $CO_2$ in $N_2$, 4% $CO_2$ in $N_2$, and pure $N_2$ for EMM-44 (2-ampd-$Mg_2$(dobpdc)), where the dashed horizontal line indicates the capacity corresponding to adsorption of 1 $CO_2$ per diamine, in accordance with an embodiment of the present disclosure.
Figure 7:
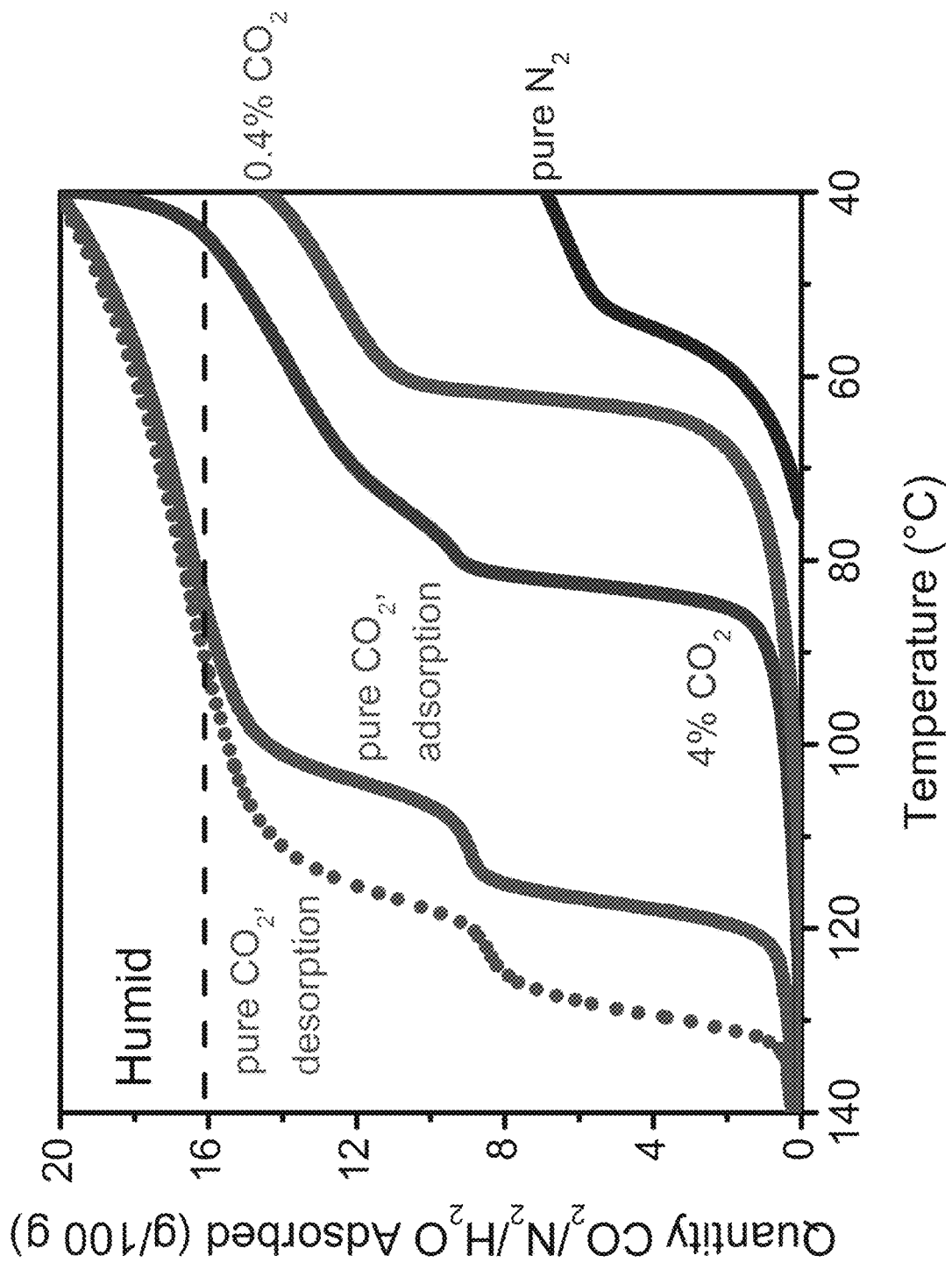
FIG. 7 illustrates humid adsorption and desorption isobars for pure $CO_2$ and humid adsorption isobars for 0.4% $CO_2$ in $N_2$, 4% $CO_2$ in $N_2$, and pure $N_2$ for EMM-44 (2-ampd-$Mg_2$(dobpdc)), where the dashed horizontal line indicates the capacity corresponding to adsorption of 1 $CO_2$ per diamine, in accordance with an embodiment of the present disclosure.

The performance of EMM-44 (2-ampd-$Mg_2$(dobpdc)) under humid conditions is important for its application for the target process. Humid isobars collected by thermogravimetric analysis (TGA) suggest that EMM-44 adsorbs $CO_2$ more effectively in the presence of $H_2O$ (~1.3% of the stream), as evidenced by an increase in the adsorption step temperatures under humid $CO_2$ compared to dry $CO_2$ (compare FIG. 7 to FIG. 6). This may be due to preferential stabilization of the $CO_2$-bound phase in the presence of $H_2O$ and/or due to $H_2O$ facilitating the proton transfers required for cooperative chemisorption of $CO_2$. Consistent with this hypothesis, EMM-44 displays improved adsorption from a 0.4% $CO_2$ in $N_2$ stream in the presence of water (compare FIG. 7 to FIG. 6). However, the dry and humid $CO_2$ adsorption isobars nearly perfectly overlay at 60° C., suggesting that parasitic water co-adsorption should be minimal at this temperature.

Figure 8:
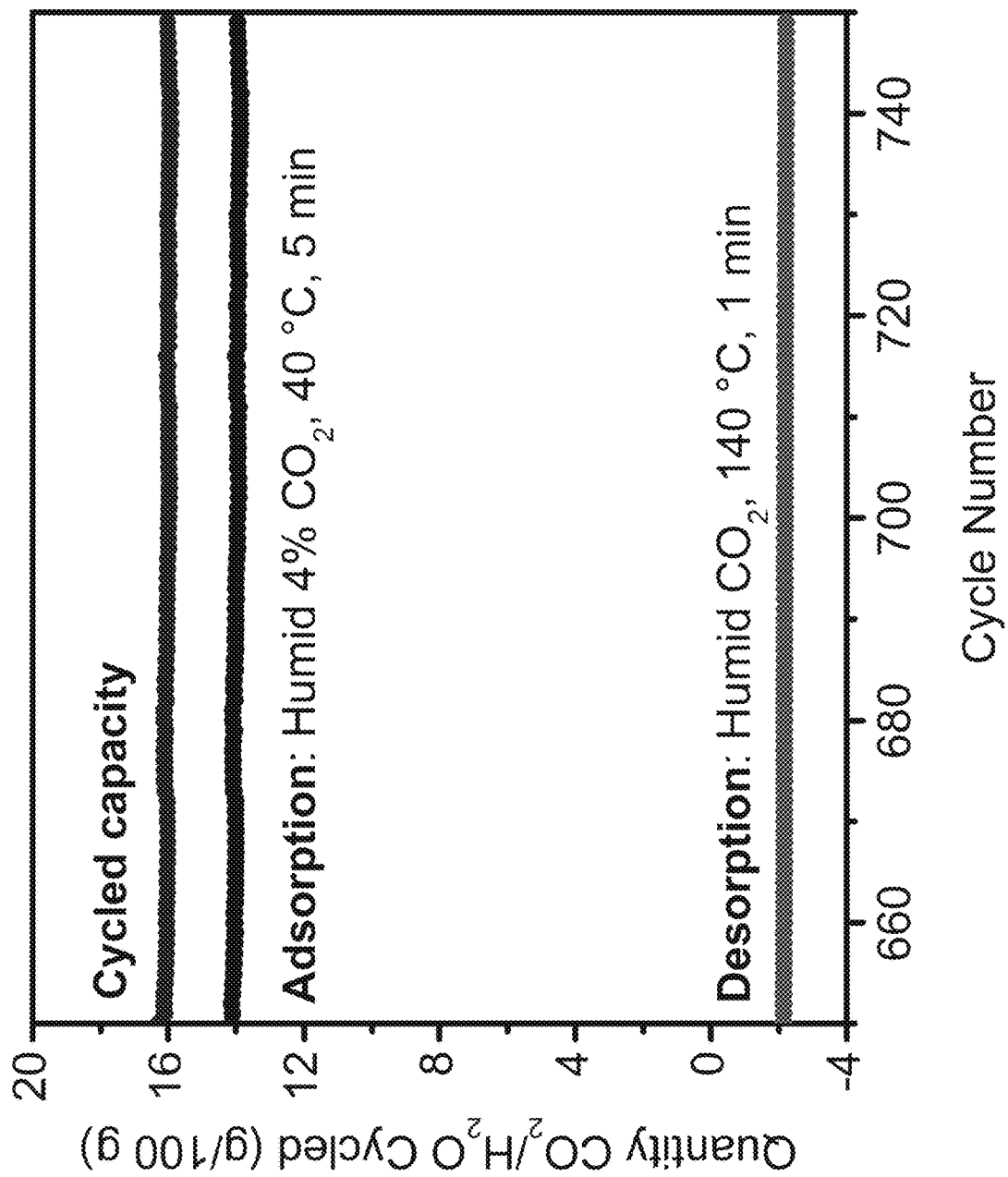
FIG. 8 illustrates the last 100 of 750 adsorption/desorption cycles with EMM-44 (2-ampd-$Mg_2$(dobpdc)), in which adsorption: humid 4% $CO_2$ in $N_2$, 40° C., 5 min, desorption: humid pure $CO_2$, 140° C., 1 min, and the baseline value of 0 g/100 g is defined as the mass after activation under humid 4% $CO_2$ in $N_2$ for 20 min at 150° C. prior to the first cycle, and in which the diamine loading was found to be 94% after this experiment, in accordance with an embodiment of the present disclosure.
Figure 9:
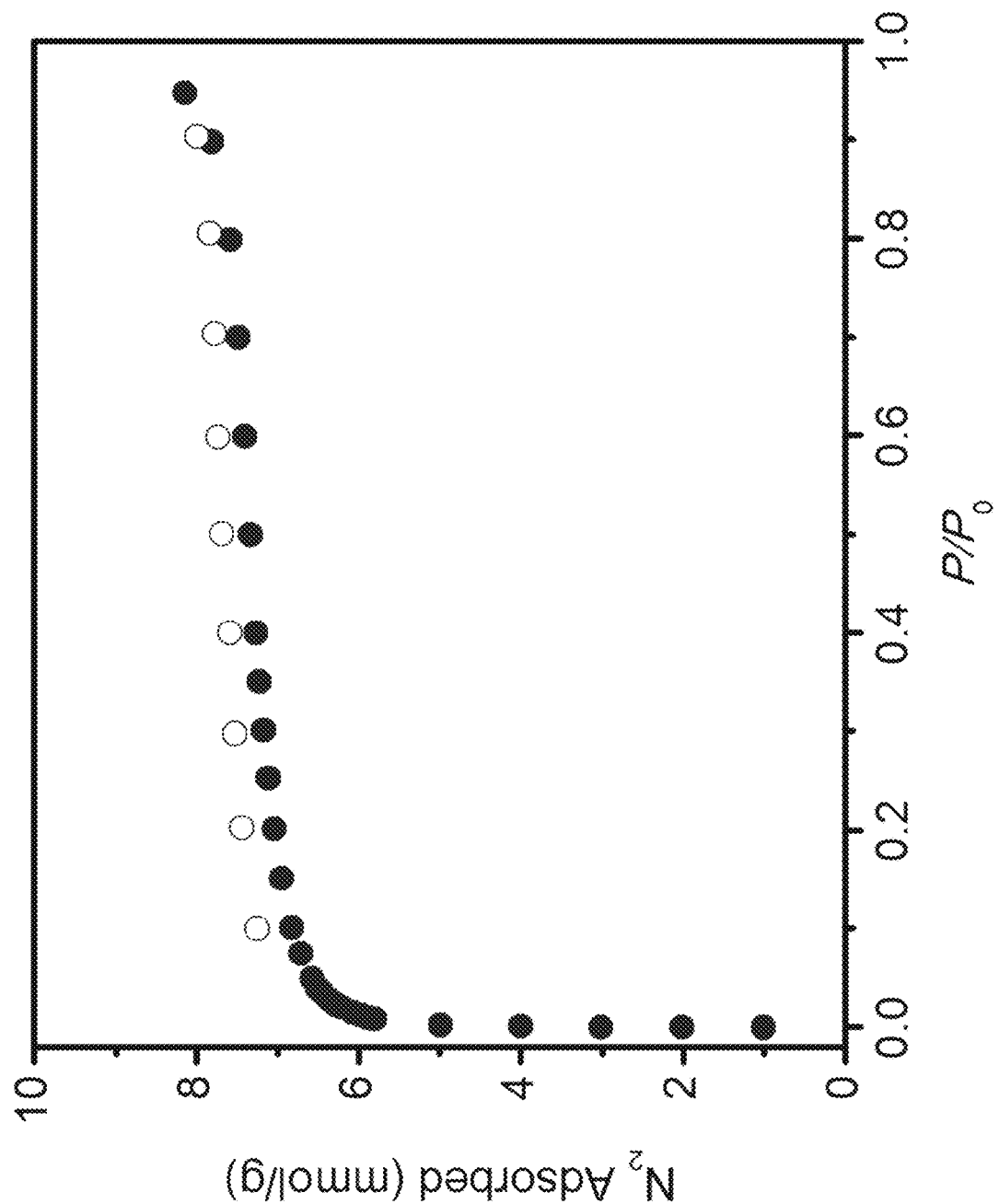
FIG. 9 illustrates 77 K $N_2$ adsorption isotherm of activated EMM-44 (2-ampd-$Mg_2$(dobpdc)), in which desorption data are shown with open circles, the Brunauer-Emmett-Teller (BET) surface area of this material is 618±2 $m^2$/g, and the Langmuir surface area is 764±6 $m^2$/g, in accordance with an embodiment of the present disclosure.

The stability of EMM-44 (2-ampd-$Mg_2$(dobpdc)) to humid adsorption/desorption cycling in a simulated temperature swing adsorption (TSA) process was assessed by thermogravimetric analysis (FIG. 8). This material displayed excellent cycling stability, as demonstrated with the last 100 of 750 adsorption/desorption cycles (FIG. 8). With adsorption at 40° C., the adsorption capacity was ~16 g/100 g (3.6 mmol/g if all $CO_2$). In addition, short adsorption (5 min) and desorption (1 min) intervals could be used due to the fast adsorption/desorption kinetics and rapid diffusion in this material. The latter is due to the high Brunauer-Emmett-Teller (BET) surface area of this material (618±2 $m^2/g$), as determined from the 77 K $N_2$ adsorption isotherm (FIG. 9). Digestion of the material after this cycling experiment confirmed the ratio of diamine to $Mg^{2+}$ sites was still high (93%), with the bulk of the loss likely due to diamine volatilization from defect sites. Similarly effective adsorption/desorption cycling could be achieved with adsorption at 60° C. from a humid 4% stream with minimal diamine loss after 200 cycles (Table 1).

TABLE 1

Diamine loadings of EMM-44 (2-ampd-$Mg_2$(dobpdc)) after exposure to humid gas streams.

| Experiment | Diamine Loading |
|---|---|
| 200 humid adsorption/desorption cycles, adsorb at 60° C. | 93% |
| 200 humid adsorption/desorption cycles, adsorb at 40° C. | 94% |
| 750 humid adsorption/desorption cycles, adsorb at 40° C. | 94% |
| Flowing humid $CO_2$ for 12 h at 140° C. | 98% |
| Flowing humid $CO_2$ for 12 h at 160° C. | 97% |
| Flowing humid $CO_2$ for 12 h at 180° C. | 92% |
| Flowing humid $CO_2$ for 12 h at 200° C. | 79% |

Figure 10:
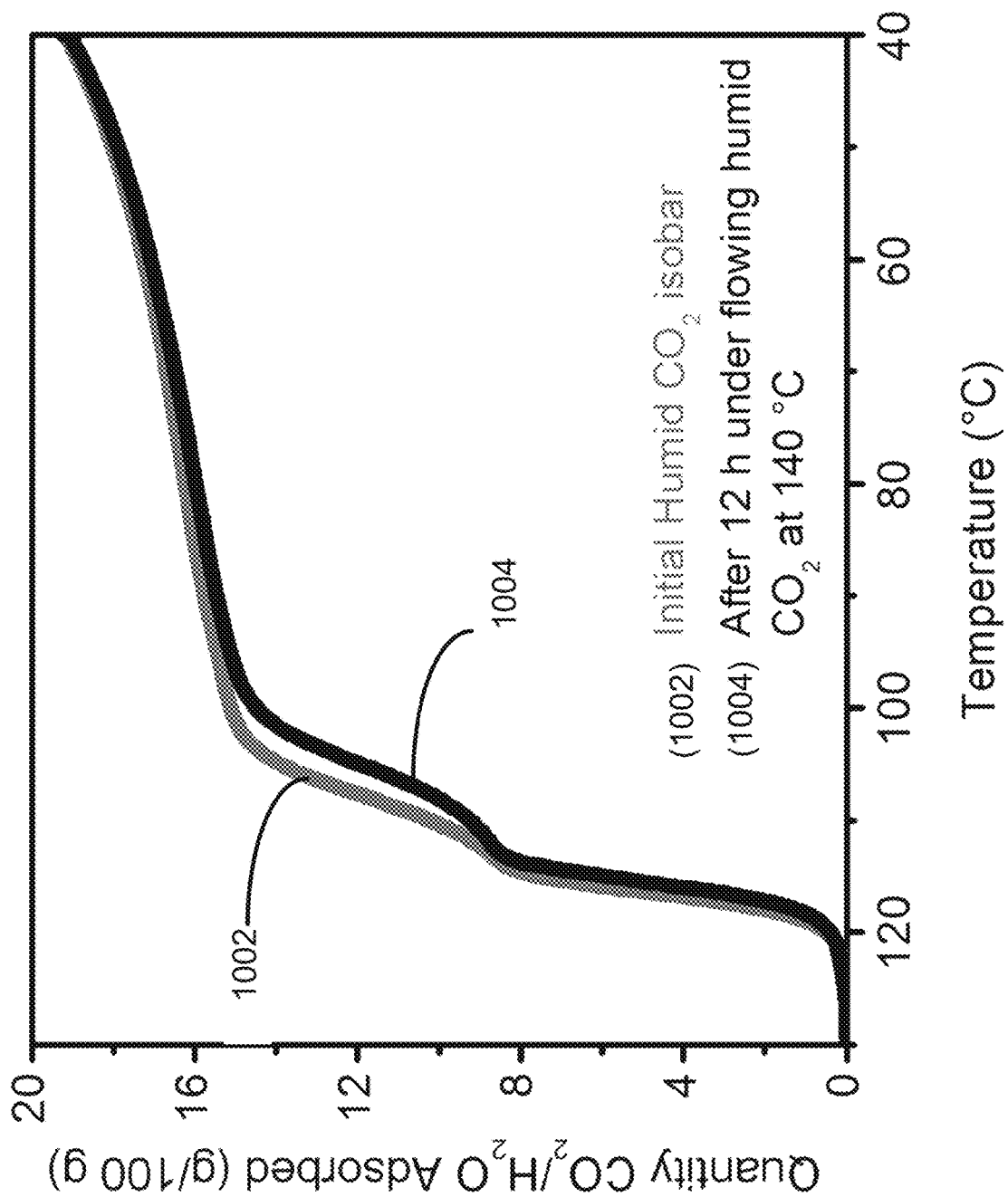
FIG. 10 illustrates humid $CO_2$ adsorption isobars after activation (1002) and after holding the material under flowing humid $CO_2$ for 12 h at 140° C. (1004), in accordance with an embodiment of the present disclosure.
Figure 11:
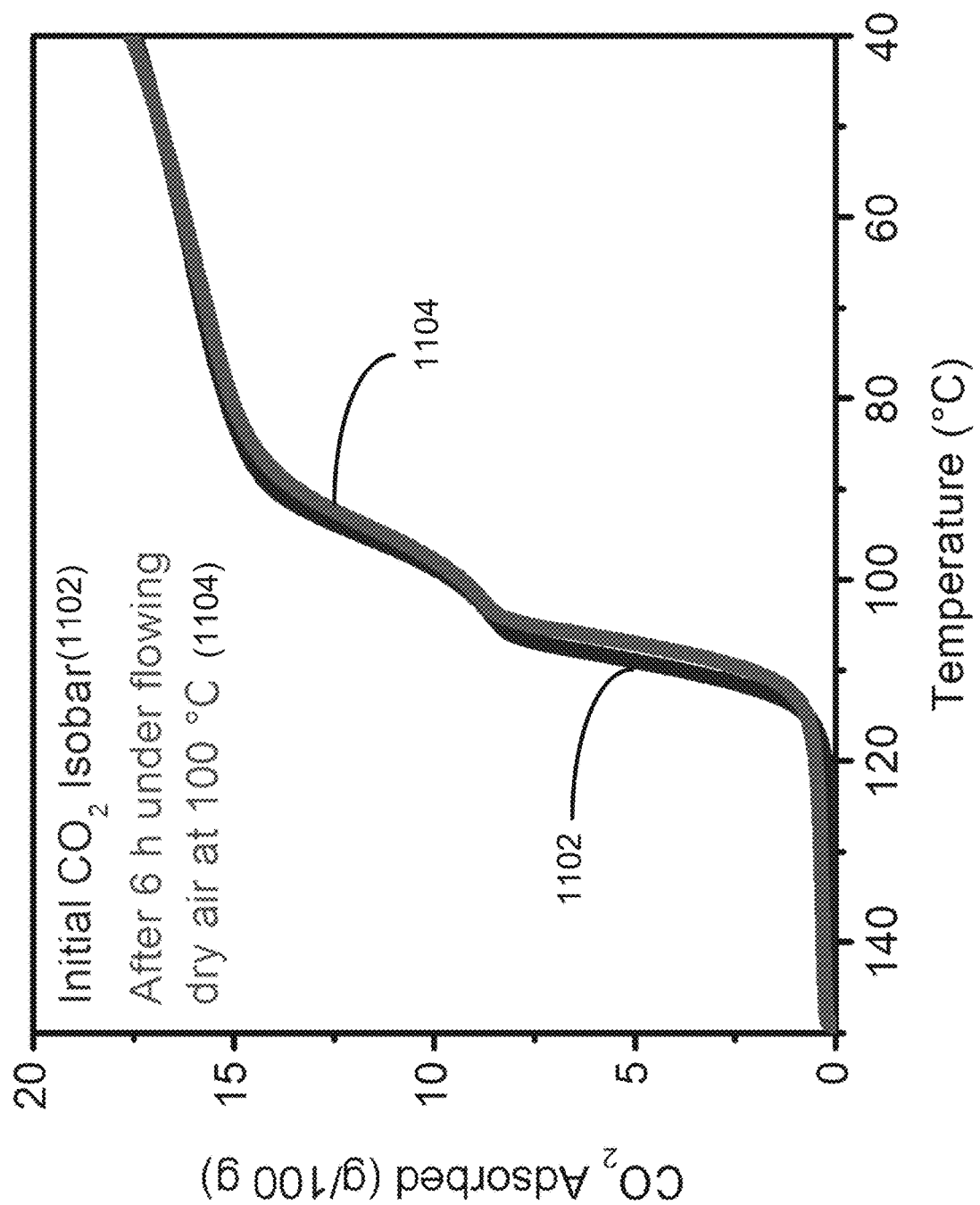
FIG. 11 illustrates dry $CO_2$ adsorption isobars after activation (1102) and after holding the material under flowing dry air (21% $O_2$) for 6 h at 100° C. (1104), in accordance with an embodiment of the present disclosure.
Figure 12:
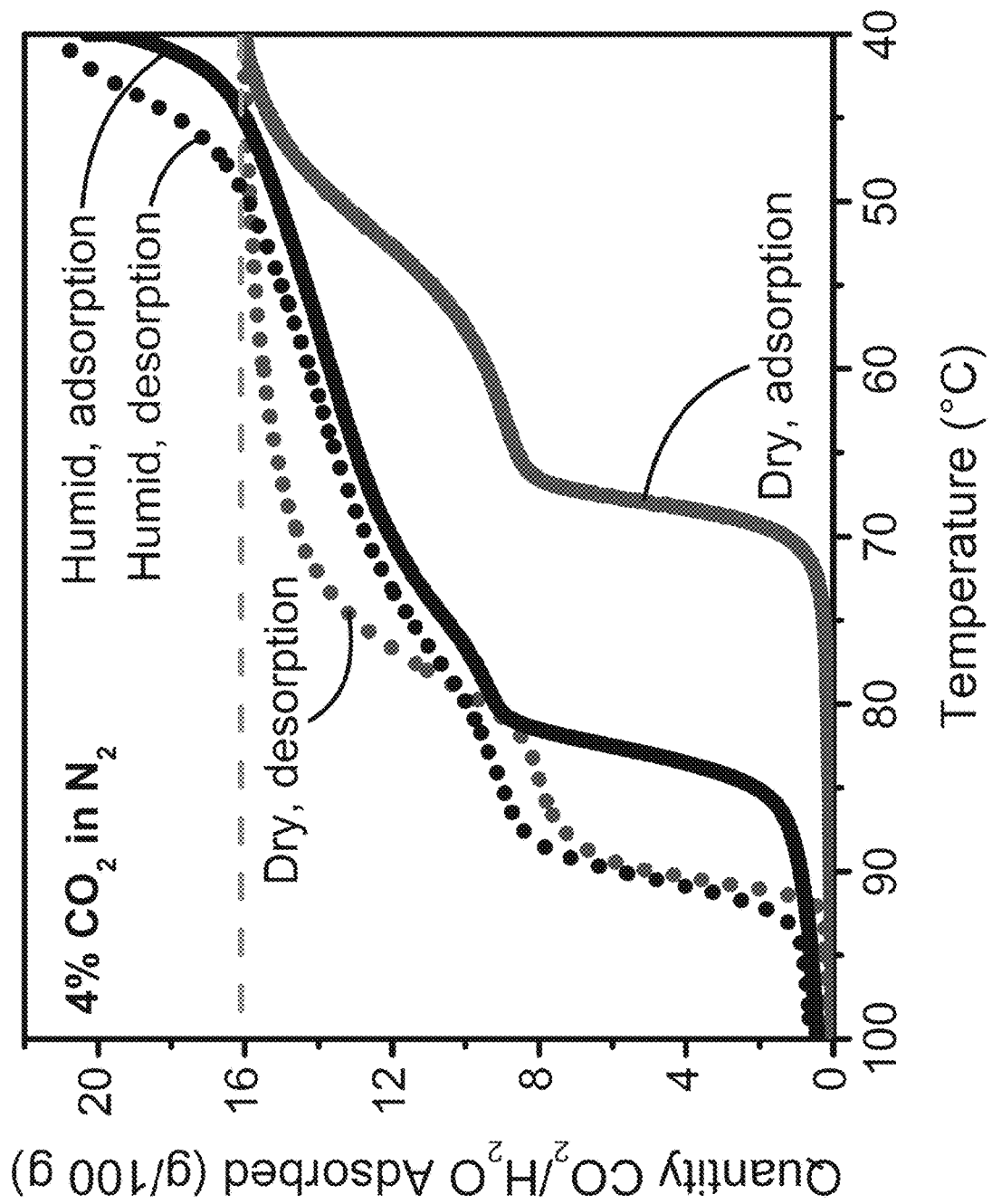
FIG. 12 illustrates adsorption (solid lines) and desorption (dotted lines) isobars with humid 4% $CO_2$ in $N_2$ and dry 4% $CO_2$ in $N_2$ for EMM-44 (2-ampd-$Mg_2$(dobpdc)), in which a ramp rate of 0.1° C./min was used, and where the dashed horizontal line indicates the capacity corresponding to adsorption of 1 $CO_2$ per diamine, in accordance with an embodiment of the present disclosure.

The thermal stability of EMM-44 (2-ampd-$Mg_2$(dobpdc)) towards diamine loss after exposure at high temperatures is also excellent (Table 1), with the material surviving treatment with flowing humid $CO_2$ for 12 h at 140° C. (the temperature required to fully desorb $CO_2$ and $H_2O$) with a high diamine loading (98%) and sharp $CO_2$ adsorption steps (FIG. 10). Indeed, EMM-44 is stable to diamine loss at temperatures up to 180° C. (Table 1). Additionally, EMM-44 is stable to prolonged exposure to $O_2$, another potentially reactive constituent of natural gas flue gas, as treatment with flowing dry air at 100° C. for 6 h had no effect on its $CO_2$ adsorption profile (FIG. 11). Lastly, the 4% $CO_2$ adsorption isobars under dry and humid conditions confirm that EMM-44 is capable of removing $CO_2$ from a 4% $CO_2$ stream at temperatures as high as 85° C. in the presence of water, although increased water co-adsorption is observed at temperatures ≤45° C. (FIG. 12).

Figure 13:
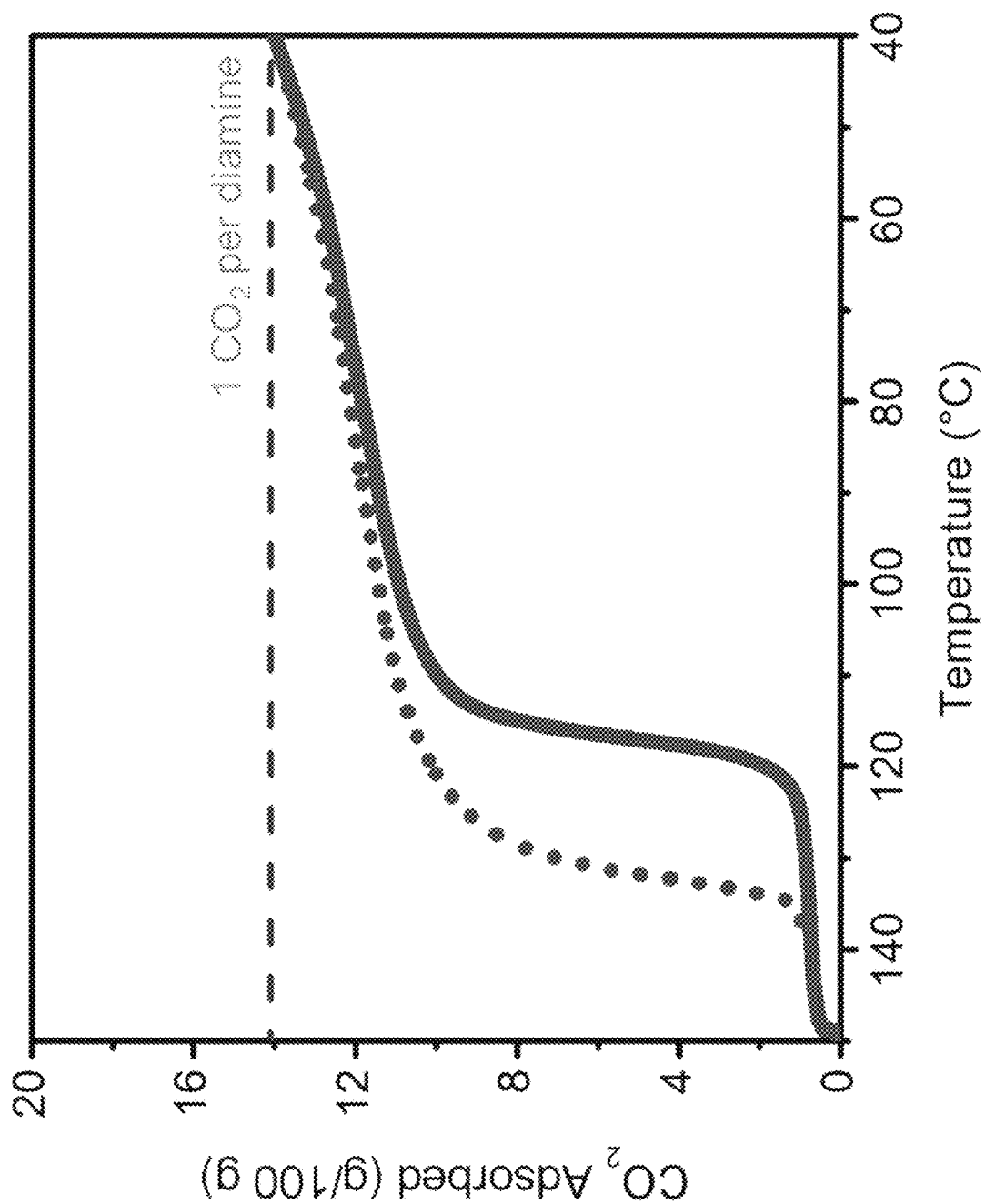
FIG. 13 illustrates pure $CO_2$ adsorption (solid line) and desorption (dotted line) isobars for EMM-45 (2-ampd-$Mg_2$(dotpdc)), in which a ramp rate of 1° C./min was used, and the adsorption capacity corresponding to 1 $CO_2$ per diamine is indicated, in accordance with an embodiment of the present disclosure.
Figure 14:
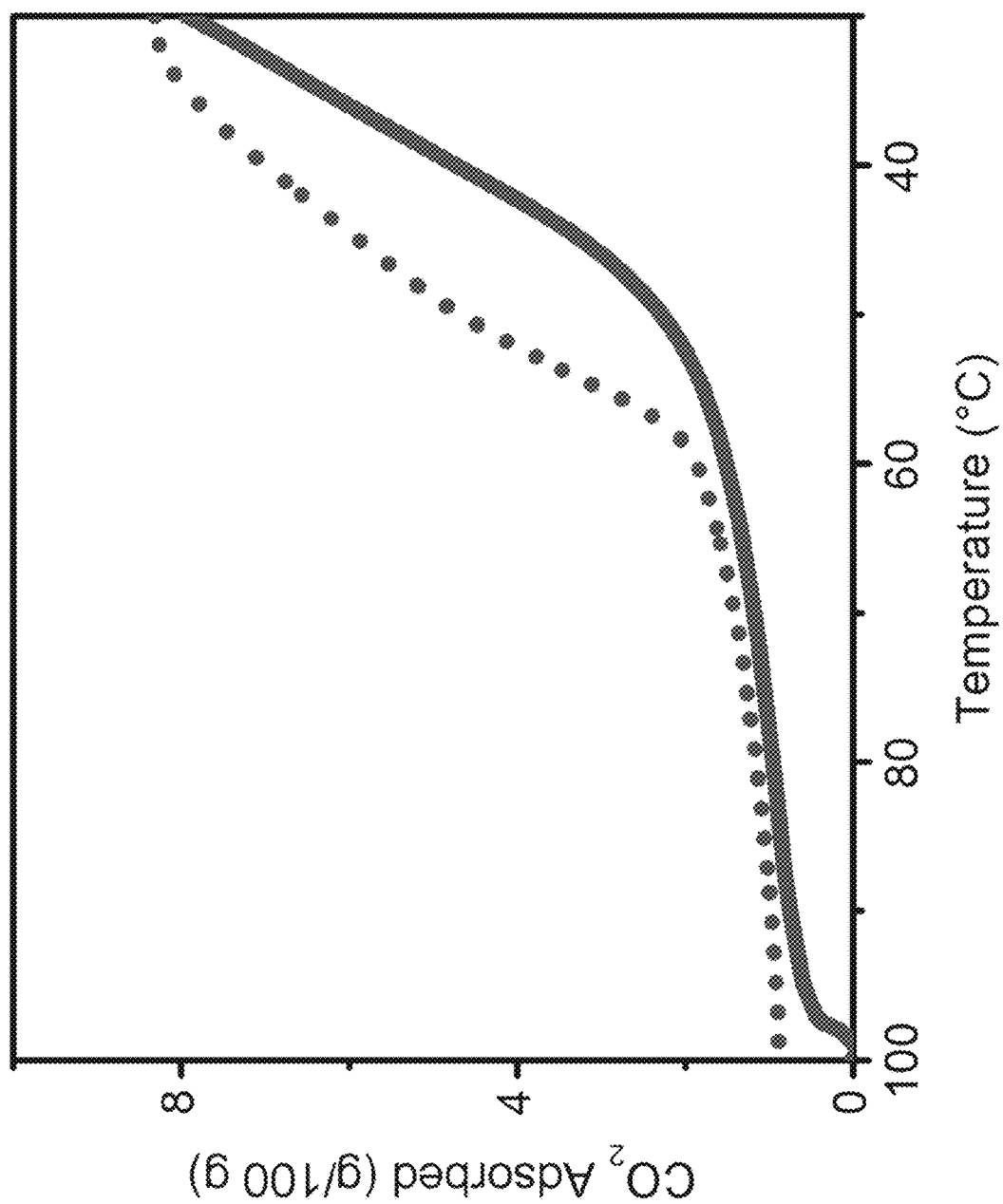
FIG. 14 illustrates pure $CO_2$ adsorption (solid line) and desorption (dotted line) isobars for EMM-44(Zn) (2-ampd-$Zn_2$(dobpdc)), in which a ramp rate of 1° C./min was used, in accordance with an embodiment of the present disclosure.

The diamine 2-ampd was also appended to the expanded framework $Mg_2$(dotpdc) (dotpdc$^{4-}$=4,4"-dioxido-[1,1':4',1"-terphenyl]-3,3"-dicarboxylate). The resulting adsorbent (EMM-45) displayed a single $CO_2$ adsorption/desorption step in the pure $CO_2$ isobar (FIG. 13), with the adsorption step occurring at an elevated temperature (121° C.) compared to the higher temperature adsorption step of EMM-44 (2-ampd-$Mg_2$(dobpdc)) (113° C.), indicating it may demonstrate improved capture of $CO_2$ from low partial pressure streams compared to the parent material. The lack of two adsorption steps in the expanded framework is consistent with previous results regarding the origin of the two $CO_2$ adsorption/desorption steps in bulky diamine-appended variants of $Mg_2$(dobpdc). See Siegelman et al., 2017, J. Am. Chem. Soc., 139, p. 10526 and Milner et al., 2018, Chem. Sci., 9, p. 160. In addition, the diamine 2-ampd could be appended to isostructural metal variants of the parent frameworks. For example, appending 2-ampd to $Zn_2$(dobpdc), an isostructural metal variant of $Mg_2$(dobpdc), produced the adsorbent EMM-44(Zn) (2-ampd-$Zn_2$(dobpdc)), which also displays step-shaped adsorption of $CO_2$ (FIG. 14).

Figure 15:
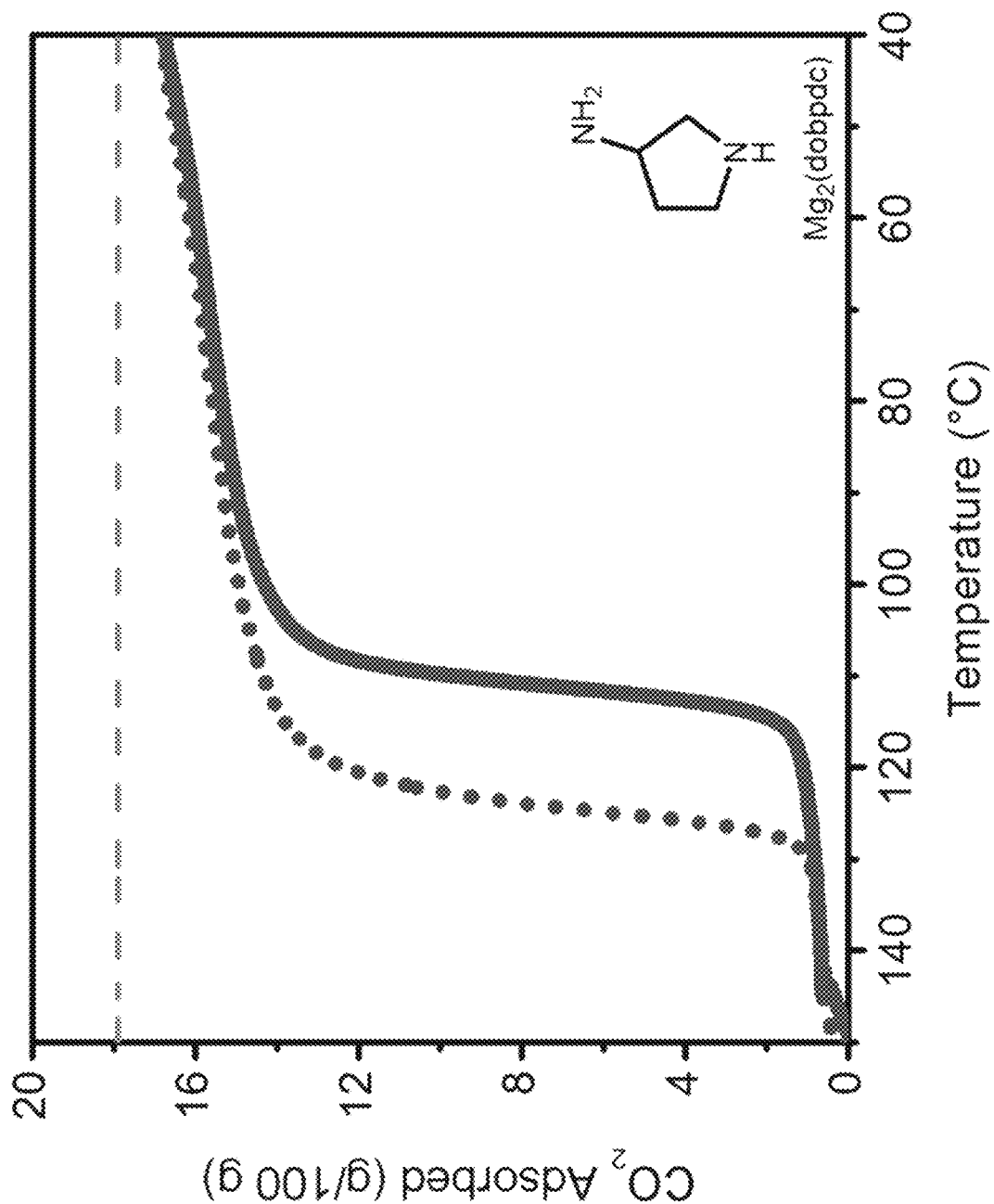
FIG. 15 illustrates a pure $CO_2$ adsorption (solid line) and desorption (dotted line) isobars for EMM-44(3-apyrr) (3-apyrr-$Mg_2$(dobpdc)), in which a ramp rate of 1° C./min was used, and the adsorption capacity corresponding to 1 $CO_2$ per diamine (horizontal dashed line) is indicated, in accordance with an embodiment of the present disclosure.

In order to examine the generality of this strategy, the cyclic diamine 3-aminopyrrolidine (3-apyrr) was also appended to $Mg_2$(dobpdc) (FIG. 15). The resulting adsorbent, EMM-44(3-apyrr) (3-apyrr-$Mg_2$(dobpdc)), displayed a single $CO_2$ adsorption step at a similar temperature (115° C.) compared to EMM-44 (2-ampd-$Mg_2$(dobpdc)), indicating it is also promising for the removal of $CO_2$ from natural gas flue gas.

Figure 16:
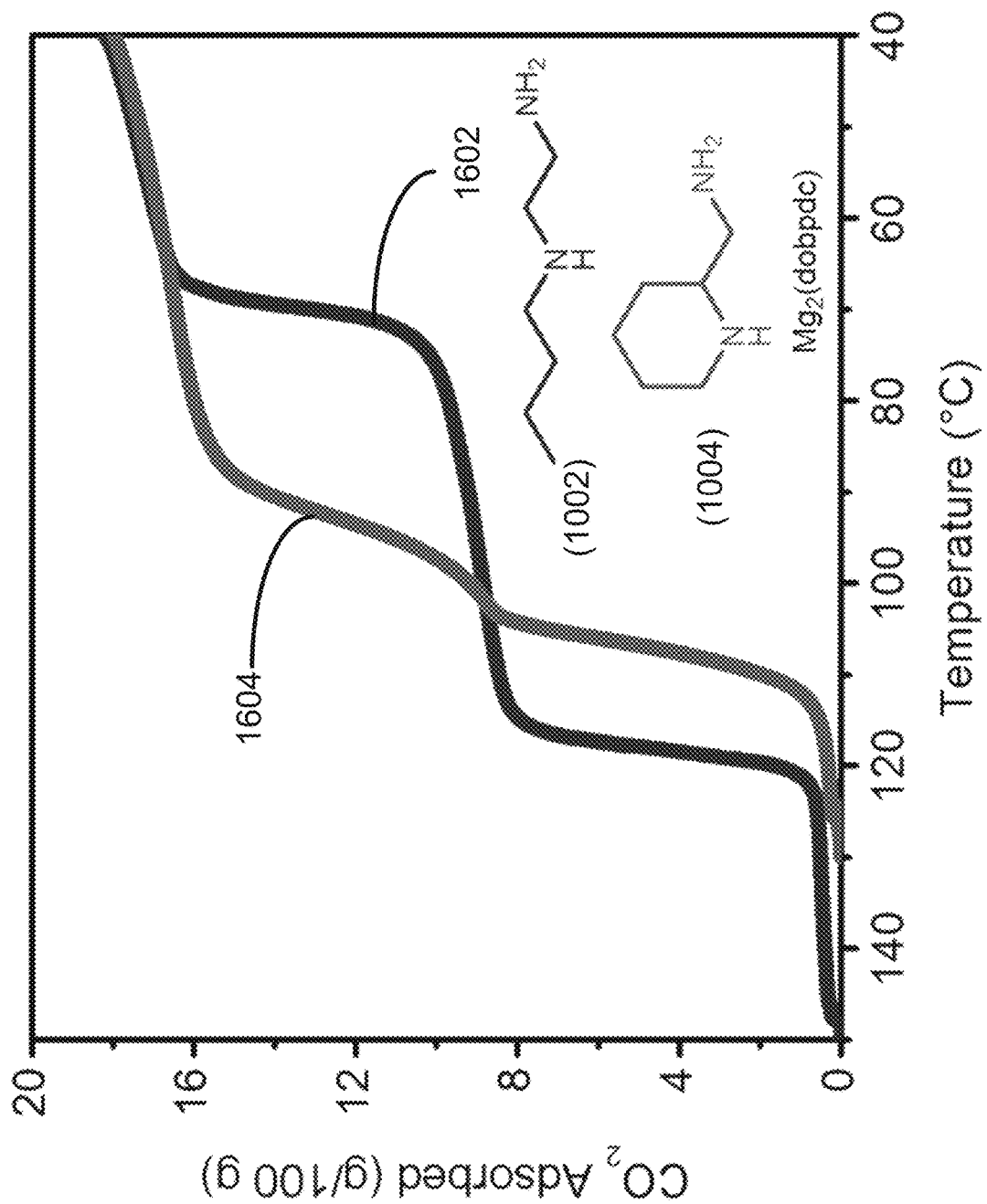
FIG. 16 illustrates pure $CO_2$ adsorption (solid line) isobars for EMM-44 (2-ampd-$Mg_2$(dobpdc)) (1604) and EMM-50(nBu-2) (N-(n-butylethylenediamine)-$Mg_2$(dobpdc)) (1602), in which a ramp rate of 1° C./min was used, in accordance with an embodiment of the present disclosure.

The $CO_2$ adsorption properties of $Mg_2$(dobpdc) functionalized with 2-ampd (EMM-44) were also compared to those of $Mg_2$(dobpdc) functionalized with corresponding diamine with a linear alkyl group, N-(n-butyl)ethylenediamine (EMM-50(nBu-2)) (FIG. 16). Although both adsorbents display two $CO_2$ adsorption/desorption steps, the steps of EMM-44 (2-ampd-$Mg_2$(dobpdc)) are much closer to one another. The two high temperature adsorption steps of EMM-44 should increase its adsorption capacity from natural gas flue gas. Therefore, the ability of EMM-44 to capture approximately 90% of the $CO_2$ from a humid 4% $CO_2$ in $N_2$ stream, coupled with its high thermal, oxidative, and hydrolytic stability, renders this material highly promising for carbon capture from natural gas flue gas.

Figure 17:
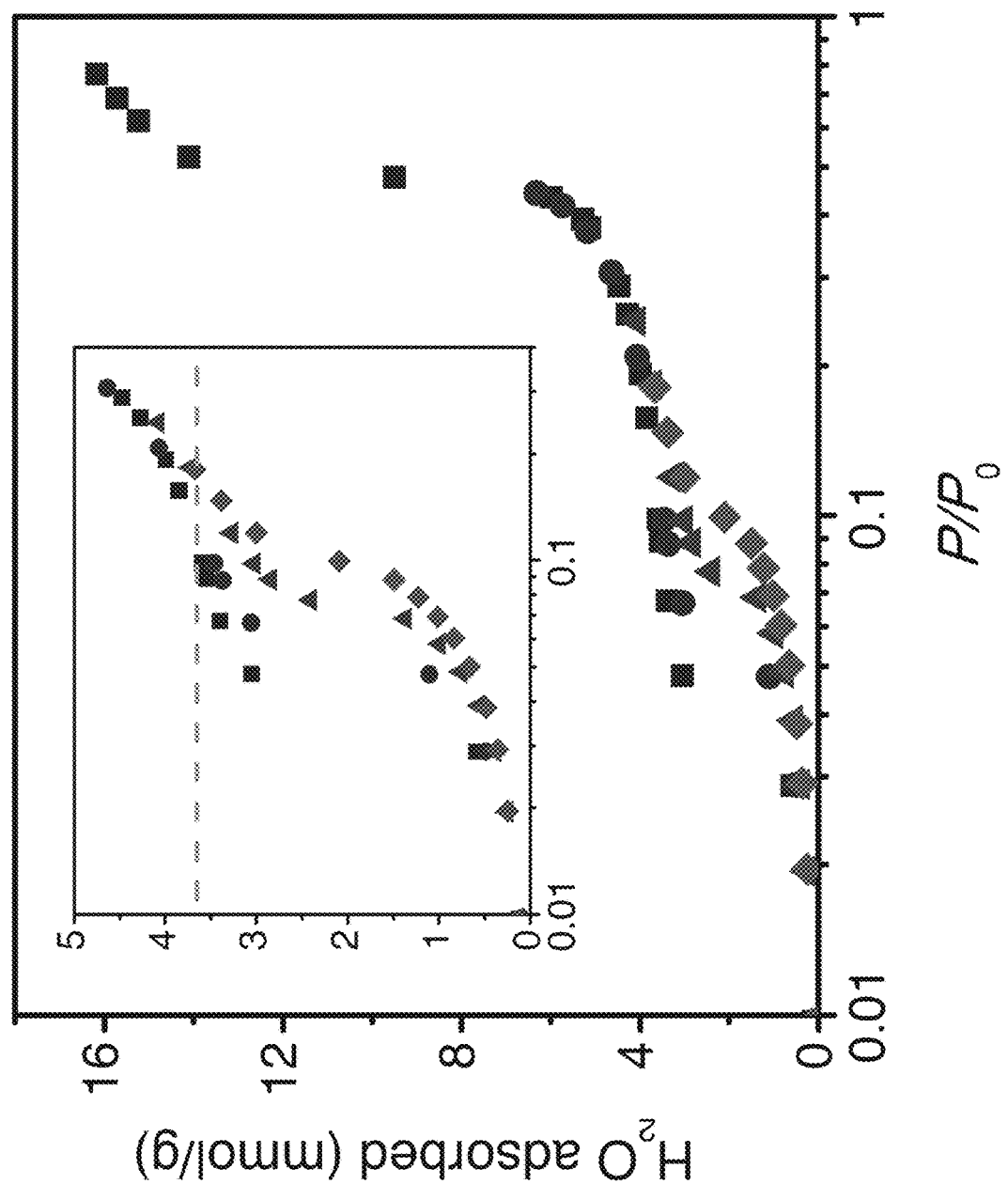
FIG. 17 illustrates isotherms for $H_2O$ at 30° C. (squares), 40° C. (circles), 50° C. (triangles), and 60° C. (diamonds) for EMM-44 (2-ampd-$Mg_2$(dobpdc)), in which the inset shows an enlargement of the low-pressure region, with the dashed horizontal line indicating the capacity corresponding to adsorption of one $H_2O$ molecule per diamine, in accordance with the present disclosure.

The $H_2O$ adsorption isotherms for EMM-44 (2-ampd-$Mg_2$(dobpdc)) at 30° C., 40° C., 50° C., and 60° C. show that $H_2O$ first adsorbs to a capacity equivalent to 1 $H_2O$ molecule per diamine by $P/P_0$=0.2, followed by condensation at higher relative pressures (FIG. 17). Differential enthalpies of adsorption of $-\Delta h_{ads}$=50-65 kJ/mol $H_2O$ were calculated for $H_2O$ loadings from 0.25-1.25 mmol $H_2O$/g EMM-44. Cooperative adsorption of $CO_2$ is possible in the presence of $H_2O$ because $H_2O$ cannot follow the chemisorption mechanism of $CO_2$ and therefore has a separate binding site from $CO_2$.

Breakthrough experiments were conducted with EMM-44 (2-ampd-$Mg_2$(dobpdc)) under dry and humid conditions to characterize the performance of the material in a simulated fixed bed process. Experiments were performed using a 6" stainless-steel bed (0.25" OD, wall thickness 0.035") containing 0.73 g of 25-45 mesh pellets of EMM-44 formed from sieved, compressed powder. The material was initially activated at 120° C. under 30 mL/min of He flow for 30 min. Subsequent reactivation between breakthrough cycles was performed under 30 mL/min of helium or argon flow at 100° C. for 30-60 minutes. For humid experiments, the adsorbent bed was first pre-saturated with water using a humid feed of helium. Simulated humid flue gas (2-3% $H_2O$) was generated by passing pre-mixed cylinders of $CO_2$ in $N_2$ through a water bubbler. The bubbler was pre-saturated with $CO_2$ prior to humid breakthrough experiments. In all experiments, $N_2$ breakthrough capacities were within error of zero, where the error was determined from the integrated breakthrough time corresponding to the time resolution set by the scan rate of the gas chromatograph (1 min).

Figure 18:
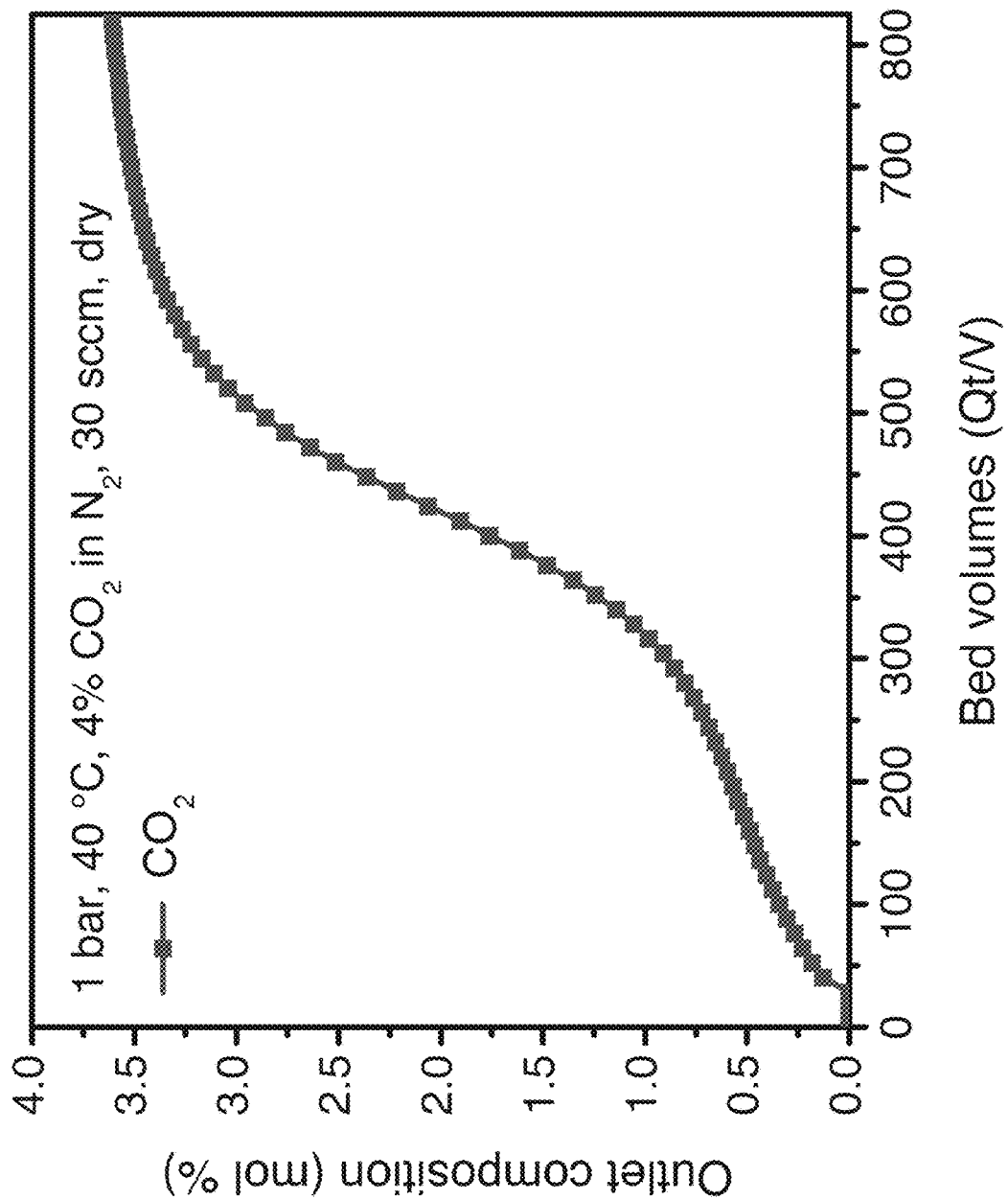
FIG. 18 illustrates the $CO_2$ breakthrough profile for an experiment with 30 sccm of dry 4% $CO_2$ in $N_2$ at 40° C. and 1 bar, in accordance with an embodiment of the present disclosure.

FIG. 18 shows the $CO_2$ breakthrough curve for 30 sccm of dry 4% $CO_2$ in $N_2$ at 40° C. and 1 bar. Prior to full breakthrough, the initial portion of the breakthrough shows $CO_2$ "slip," a direct result of the step-shaped adsorption isotherms. Because the material is unable to capture $CO_2$ once the partial pressure of $CO_2$ in the bed drops below the step pressure, the slip concentration roughly correlates with the $CO_2$ adsorption step pressure at the experimental temperature. The dry breakthrough experiment at 40° C. revealed a slightly higher slip (~5 mbar) and correspondingly lower capture rate (~88%) than anticipated based on the $CO_2$ adsorption isotherms (expected slip of 0.4 mbar;

expected capture rate of 99%). This is likely due in part to heat rise in the bed upon $CO_2$ adsorption. A $CO_2$ capacity at exhaustion of 2.7 mmol/g was calculated from this experiment.

Figure 19:
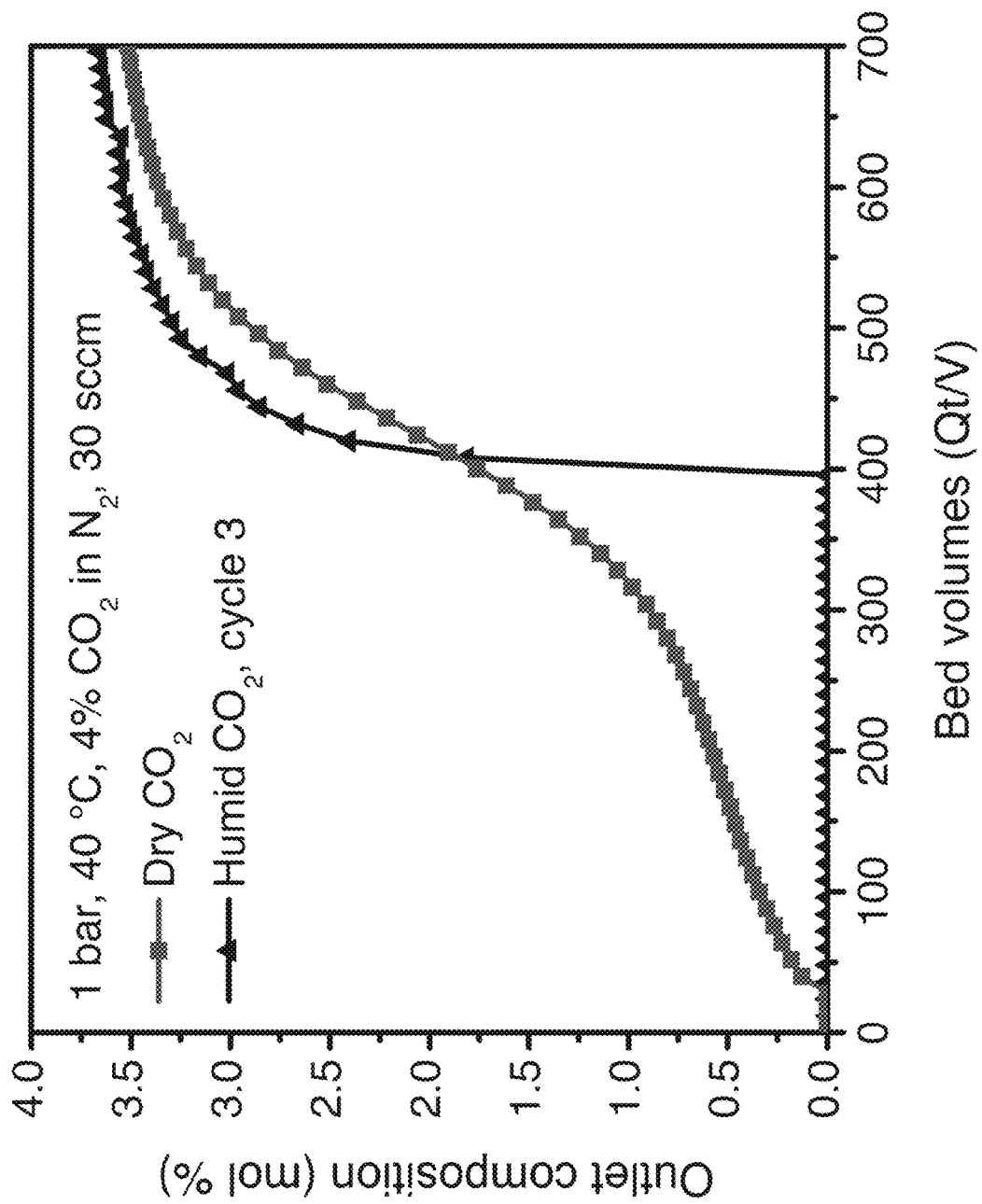
FIG. 19 illustrates the humid and dry breakthrough profiles for experiments with 30 sccm of 4% $CO_2$ in $N_2$ at 40° C. and 1 bar, in accordance with an embodiment of the present disclosure.
Figure 20:
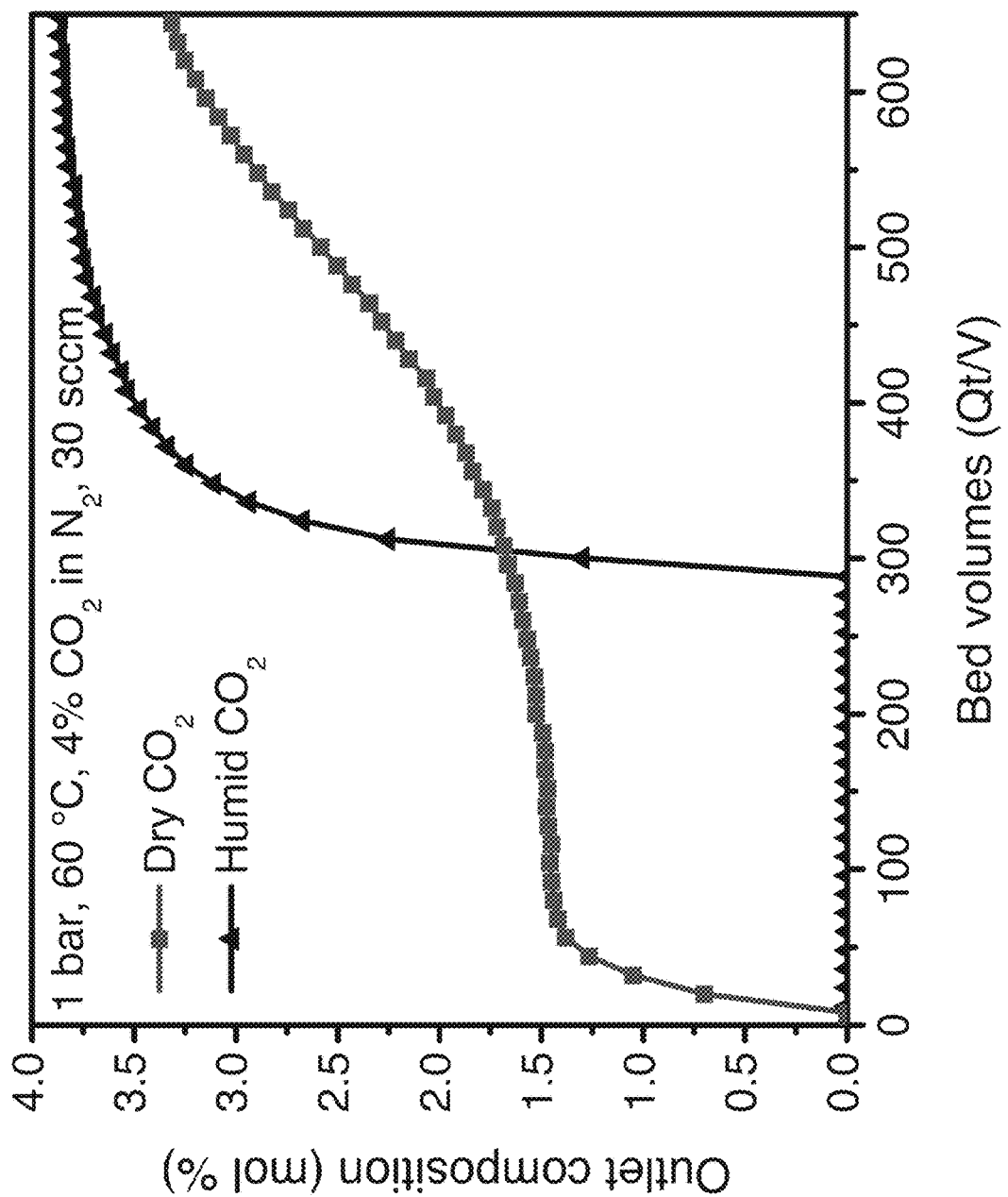
FIG. 20 illustrates the humid and dry breakthrough profiles for experiments with 30 sccm of 4% $CO_2$ in $N_2$ at 60° C. and 1 bar, in accordance with an embodiment of the present disclosure.

In the presence of humid, simulated natural gas flue gas with a pre-humidified adsorbent bed, a dramatic increase in $CO_2$ capture performance was observed. FIG. 19 shows the third cycle of humid breakthrough at 40° C. (4% $CO_2$ in $N_2$, 30 sccm, 1 bar) overlayed with the equivalent dry experiment from FIG. 18. In the humid experiment, the pre-breakthrough slip is eliminated, giving rise to a single, sharp breakthrough profile. The $CO_2$ capacity at exhaustion from the humid experiment was 2.7 mmol/g, equivalent to that of the dry experiment. The $CO_2$ breakthrough profiles at 60° C. (30 sccm of 4% $CO_2$ in $N_2$, 1 bar) also show dramatically improved performance under humid conditions (FIG. 20). The humid experiment shows a slightly lower $CO_2$ capacity at exhaustion (2.0 mmol/g) compared to the dry experiment (2.4 mmol/g) but enables a large improvement in $CO_2$ capture rate (>99% capture from humid flue gas, compared to ~63% capture from dry flue gas).

The improved performance of EMM-44 (2-ampd-$Mg_2$ (dobpdc)) under humid conditions can be explained as a thermodynamic effect resulting from the influence of water on the $CO_2$ adsorption profile. As seen in the adsorption isobars (FIG. 12), incorporation of humidity shifts the $CO_2$ adsorption step to higher temperatures, equivalent to lower pressures in an isothermal experiment. For materials with step-shaped isotherms, the "slip" of $CO_2$ through the column is predicted from the intersection of the adsorption isotherm with the chord between the initial (0 mbar) and feed (40 mbar) states. See, Golden, 1973, "Theory of Fixed-Bed Performance for Ion Exchange Accompanied by Chemical Reaction." Ph.D. Dissertation, University of California, Berkeley, Calif., which is hereby incorporated by reference. This intersection point typically occurs at the step pressure, and thus the step pressure can be used to predict the $CO_2$ slip concentration in a breakthrough experiment. Shifting the isotherm to lower pressures with humidity can therefore reduce the $CO_2$ slip by lowering the pressure of the intersection point. The $CO_2$ slip can be eliminated entirely if water changes the shape of the $CO_2$ adsorption isotherm such that the chord to the feed concentration no longer intersects the isotherm. Without intending to be limited to any particular theory, from a molecular perspective, the reduced threshold for $CO_2$ adsorption in the presence of water can be explained by preferential stabilization of the $CO_2$-adsorbed phase in the presence of water, likely through hydrogen bonding of water to the carbamate formed upon reaction with $CO_2$. This result is supported by DFT calculations as well as nuclear magnetic resonance and infrared spectra showing interaction of adsorbed water with the carbamate groups. In addition, water may play a kinetic role by influencing the rate of proton transfer during formation of ammonium carbamate chains.

Figure 21:
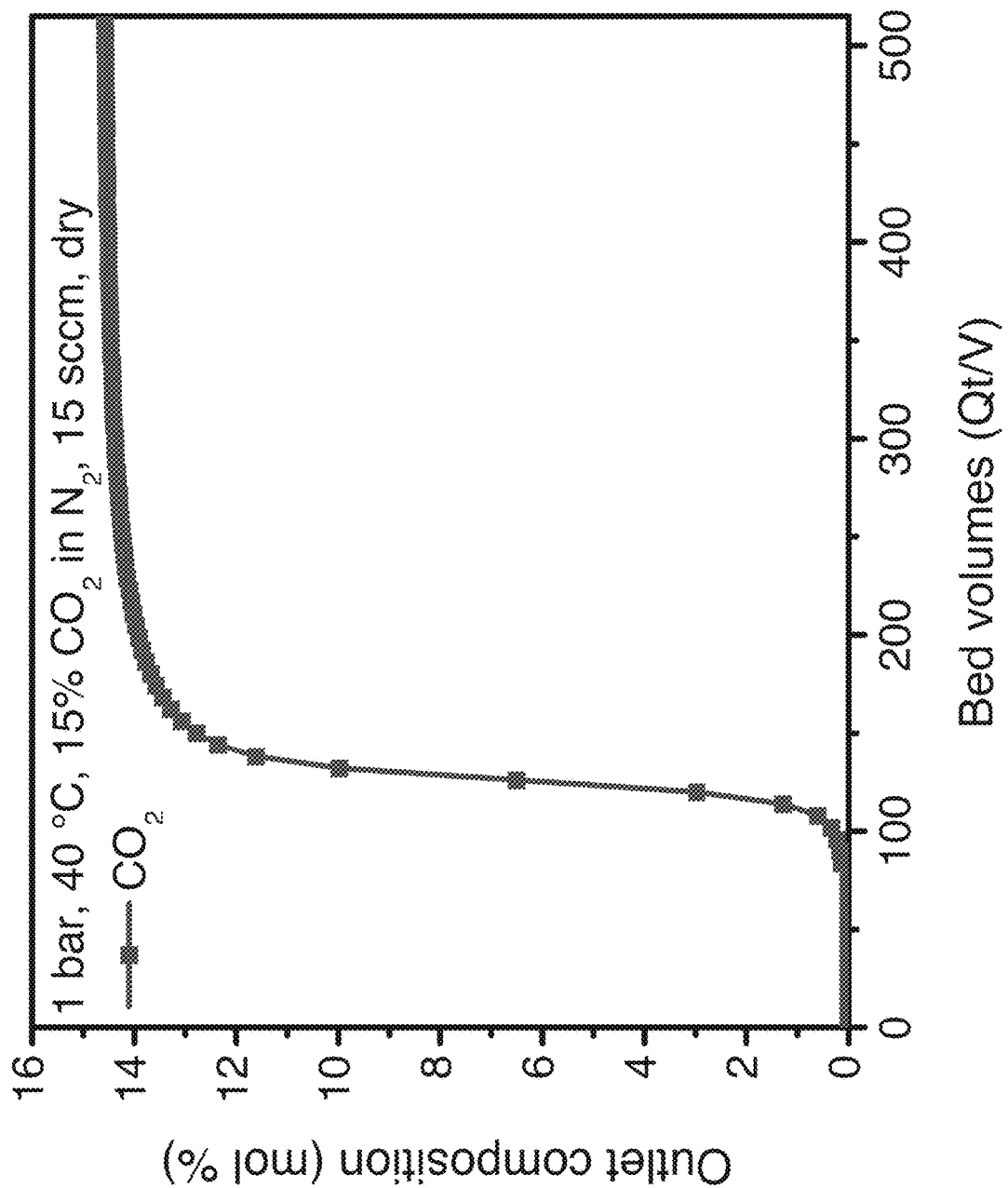
FIG. 21 illustrates the humid and dry breakthrough profiles for experiments with 15 sccm of 15% $CO_2$ in $N_2$ at 40° C. and 1 bar, in accordance with an embodiment of the present disclosure.

The breakthrough performance of EMM-44 (2-ampd-$Mg_2$ (dobpdc)) was also tested under dry, simulated coal flue gas (15% $CO_2$ in $N_2$, 15 sccm) at 40° C. and 1 bar (FIG. 21). Due to the higher feed pressure of $CO_2$ and the low step pressures (both <4 mbar) of EMM-44 at 40° C., the fraction of $CO_2$ slip is small, and a high capture rate (>95%) is easily achieved. A $CO_2$ capacity at exhaustion of 3.3 mmol/g was calculated from this experiment.

CONCLUSION

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

We claim:
1. An adsorption material, comprising:
a metal-organic framework comprising a plurality of metal ions and a plurality of polytopic organic linkers, wherein each polytopic organic linker in the plurality of polytopic organic linker is connected to at least two metal ions in the plurality of metal ions; and
a plurality of ligands, wherein each respective ligand in the plurality of ligands is amine appended to a metal ion in the plurality of metal ions of the metal-organic framework, each respective ligand in the plurality of ligands has the formula:

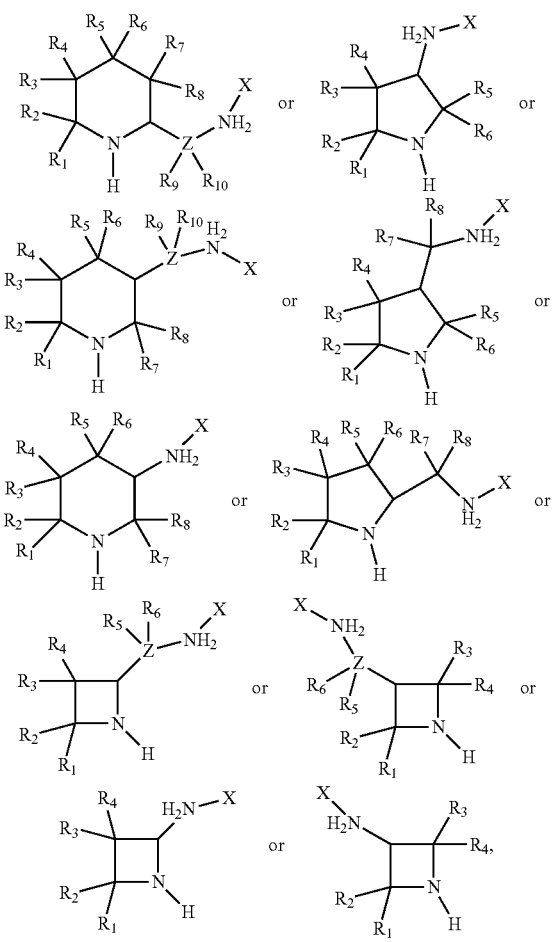

wherein,
X is a metal ion in the plurality of metal ions of the metal-organic framework,
Z is carbon, silicon, germanium, sulfur, or selenium, and
$R_1$, $R_2$, $R_3$, $R_4$, $R_5$, $R_6$, $R_7$, $R_8$, $R_9$, and $R_{10}$, are each independently selected from H, halogen, methyl, halogen substituted methyl, and hydroxyl.
2. The adsorption material of claim 1, wherein each metal ion (X) in the plurality of metal ions is Mg, Ca, Mn, Cr, Fe, Co, Ni, Cu, or Zn.

3. The adsorption material of claim 1, wherein $R_1$, $R_2$, $R_3$, $R_4$, $R_5$, $R_6$, $R_7$, $R_8$, $R_9$, and $R_{10}$ are each hydrogen.

4. The adsorption material of claim 1, wherein Z is carbon.

5. The adsorption material of claim 1, wherein each metal ion (X) in the plurality of metal ions is Mg.

6. The adsorption material of claim 1, wherein the polytopic organic linker is 4,4'-dioxidobiphenyl-3,3'-dicarboxylate (dobpdc$^{4-}$).

7. The adsorption material of claim 1, wherein the polytopic organic linker is 4,4''-dioxido-[1,1':4',1''-terphenyl]-3,3''-dicarboxylate (dotpdc$^{4-}$).

8. The adsorption material of claim 1, wherein the polytopic organic linker is dioxidobiphenyl-4,4'-dicarboxylate (para-carboxylate-dobpdc$^{4-}$, also referred to as pc-dobpdc$^{4-}$).

9. The adsorption material of claim 1, wherein the adsorption material exhibits a plurality of $CO_2$ adsorption steps upon $CO_2$ adsorption.

10. The adsorption material of claim 1, wherein the adsorption material exhibits a plurality of $CO_2$ desorption steps upon $CO_2$ desorption.

11. The adsorption material of claim 1, wherein the adsorption material exhibits a single $CO_2$ adsorption step upon $CO_2$ adsorption.

12. The adsorption material of claim 1, wherein the adsorption material exhibits a single $CO_2$ desorption step upon $CO_2$ desorption.

13. The adsorption material of claim 1, wherein the polytopic organic linker has the formula:

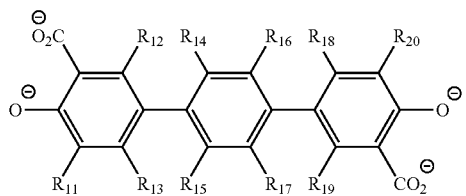

wherein, $R_{11}$, $R_{12}$, $R_{13}$, $R_{14}$, $R_{15}$, $R_{16}$, $R_{17}$, $R_{18}$, $R_{19}$, and $R_{20}$ are each independently selected from H, halogen, hydroxyl, methyl, and halogen substituted methyl.

14. The adsorption material of any one of claim 1, wherein the polytopic organic linker has the formula:

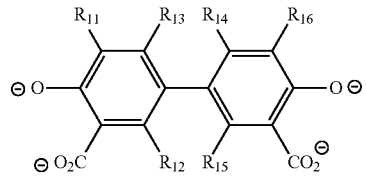

wherein, $R_{11}$, $R_{12}$, $R_{13}$, $R_{14}$, $R_{15}$, and $R_{16}$ are each independently selected from H, halogen, hydroxyl, methyl, and halogen substituted methyl.

15. The adsorption material of claim 1, wherein the polytopic organic linker has the formula:

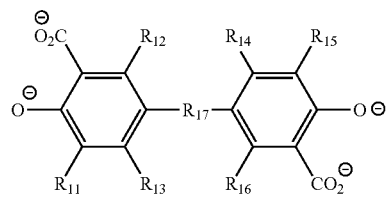

wherein, $R_{11}$, $R_{12}$, $R_{13}$, $R_{14}$, $R_{15}$, and $R_{16}$ are each independently selected from H, halogen, hydroxyl, methyl, or halogen substituted methyl, and $R_{17}$ is selected from substituted or unsubstituted aryl, vinyl, alkynyl, and substituted or unsubstituted heteroaryl.

16. The adsorption material of claim 1, wherein the polytopic organic linker has the formula:

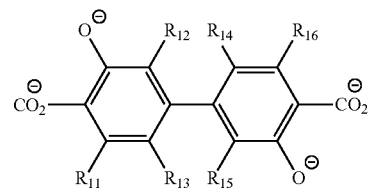

wherein, $R_{11}$, $R_{12}$, $R_{13}$, $R_{14}$, $R_{15}$, and $R_{16}$ are each independently selected from H, halogen, hydroxyl, methyl, or halogen substituted methyl.

17. The absorption material of claim 1 wherein each respective ligand in the plurality of ligands has the formula:

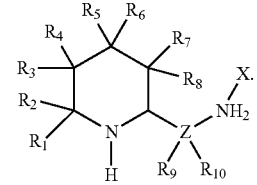

18. The absorption material of claim 17, wherein
$R_1$, $R_2$, $R_3$, $R_4$, $R_5$, $R_6$, $R_7$, $R_8$, $R_9$, and $R_{10}$ are each hydrogen,
Z is carbon, and
X is Mg.

19. The absorption material of claim 1 wherein each respective ligand in the plurality of ligands has the formula:

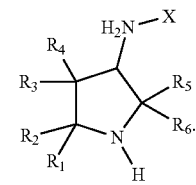

20. The absorption material of claim 19, wherein
$R_1$, $R_2$, $R_3$, $R_4$, $R_5$, and $R_6$ are each hydrogen,
Z is carbon, and
X is Mg, and wherein the diamine also coordinates with the Mg.

21. A method for abating $CO_2$ from a flue gas, the method comprising:

(a) contacting the flue gas with the adsorption material of claim 1 to reversibly adsorb $CO_2$ from the flue gas thereby generating an adsorption material enriched for $CO_2$; and (b) stripping a major portion of the $CO_2$ from the adsorption material enriched for $CO_2$ using a temperature swing adsorption method, a vacuum swing adsorption method, a pressure swing adsorption method, a concentration swing adsorption method, or a combination thereof.

22. The method of claim 21, wherein flue gas contains ≤4% (40 mbar) $CO_2$ and wherein the adsorption process removes more than 90% of the $CO_2$ from flue gas to a concentration ≤0.4% (4 mbar).

23. A method for removing $CO_2$ from a biogas, the method comprising contacting the biogas with the adsorption material of claim 1 to reversibly adsorb $CO_2$ from the biogas the contacting thereby generating an adsorption material enriched for $CO_2$ and a residual gas that contains purified methane with ≤2% $CO_2$.

24. The method of claim 23, the method further comprising adsorption of more than 90 percent of the $CO_2$ from the target gas stream and stripping the $CO_2$ from the adsorption material enriched for $CO_2$ using a temperature swing adsorption method, a vacuum swing adsorption method, a pressure swing adsorption method, a concentration swing adsorption method, or a combination thereof.

25. A method of sequestering carbon dioxide produced by a source, comprising exposing the carbon dioxide to the adsorption material of claim 1, whereby the carbon dioxide is reversibly sequestered into the adsorption material.

26. The method of claim 25, the method further comprising regenerating the adsorption material enriched for $CO_2$ using a temperature swing adsorption method, vacuum swing adsorption method, a pressure swing adsorption method, a concentration swing adsorption method, or a combination thereof.

* * * * *